United States Patent [19]

Storace et al.

[11] Patent Number: 4,672,750

[45] Date of Patent: Jun. 16, 1987

[54] THREAD MEASUREMENT TOOL

[75] Inventors: Anthony Storace, Norwalk; Albert V. Yannella, Milford, both of Conn.

[73] Assignee: AMF, Inc., N.J.

[21] Appl. No.: 891,066

[22] Filed: Jul. 31, 1986

Related U.S. Application Data

[63] Continuation of Ser. No. 771,464, Aug. 29, 1985, abandoned, which is a continuation of Ser. No. 581,407, Feb. 17, 1984, abandoned.

[51] Int. Cl.[4] .......................... G01B 5/16; G01B 5/24; G01B 7/30; G01B 19/28
[52] U.S. Cl. ............................... 33/199 R; 33/147 M; 33/169 B; 33/531
[58] Field of Search ............ 33/147 M, 148 H, 169 B, 33/174 E, 199 R, 199 B

[56] References Cited

U.S. PATENT DOCUMENTS

| 2,937,458 | 5/1960 | Leuthold . | |
|---|---|---|---|
| 3,047,960 | 8/1962 | Mittenberg et al. . | |
| 3,271,872 | 9/1966 | Heslin . | |
| 3,318,011 | 5/1967 | Johnson . | |
| 3,353,277 | 11/1967 | Johnson ...................... | 33/147 M X |
| 3,432,935 | 3/1969 | Reish . | |
| 3,537,184 | 11/1970 | Hearn .............................. | 33/199 R |
| 3,827,154 | 8/1974 | Kaifesh . | |
| 3,861,047 | 1/1975 | Dietrich . | |
| 4,139,947 | 2/1979 | Possati . | |
| 4,184,265 | 1/1980 | Horton . | |
| 4,202,109 | 5/1980 | Schasteen . | |
| 4,275,507 | 6/1981 | Haas ............................ | 33/199 R X |
| 4,330,944 | 5/1982 | Maisenbacher et al. ......... | 33/199 R |

FOREIGN PATENT DOCUMENTS

| 145322 | 12/1980 | German Democratic Rep. ... | 33/174 E |
|---|---|---|---|
| 53-148467 | 12/1978 | Japan ............................... | 33/199 R |
| 54-114264 | 9/1979 | Japan ............................... | 33/199 R |
| 57-190208 | 11/1982 | Japan ............................... | 33/169 B |

Primary Examiner—Robert S. Ward
Attorney, Agent, or Firm—Finnegan, Henderson, Farabow, Garrett & Dunner

[57] ABSTRACT

A tool for the measurement and inspection of tolerances in pipe threads on pipes and couplings, etc. formed as a pair of pivoting jaws having handles. One of the jaws includes an assembly of probes mounted for longitudinal displacement in a direction normal to the longitudinal axis of the pipe or coupling, the probes also being slideably supported within the assembly for transverse displacement in a direction parallel to the longitudinal axis of the pipe. Transducers are provided for measurement of the motion of the probe. The second jaw coacts with the first jaw for clamping action, the probes are displaced transversely so as to set into troughs of the threads whereby the probes are aligned for measurement of thread length. The taper is measured by means of an inclinometer disposed at the end of the assembly away from the probes. Normal displacement measures thread height as well as deviation in diameter, the latter providing a measure of the non-linearity of the thread pitch line.

39 Claims, 24 Drawing Figures

FIG. 3.
FIG. 6.
FIG. 4.
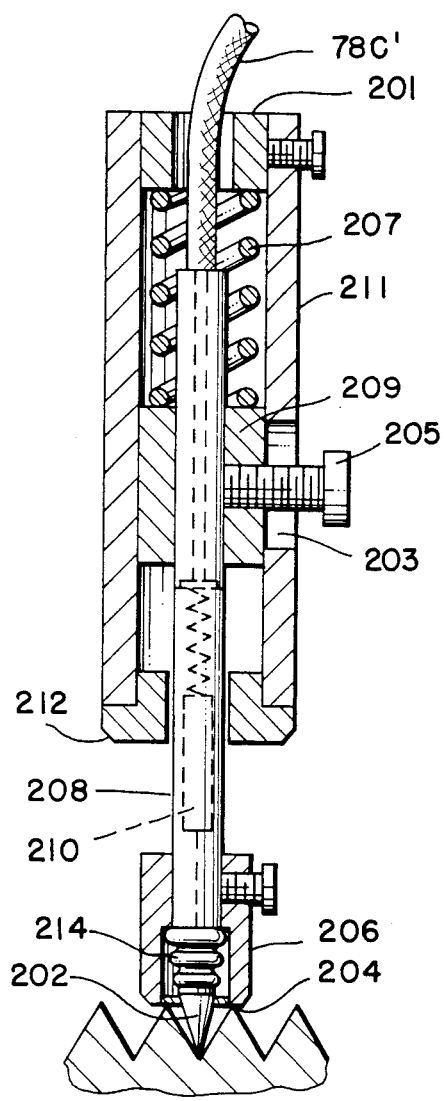
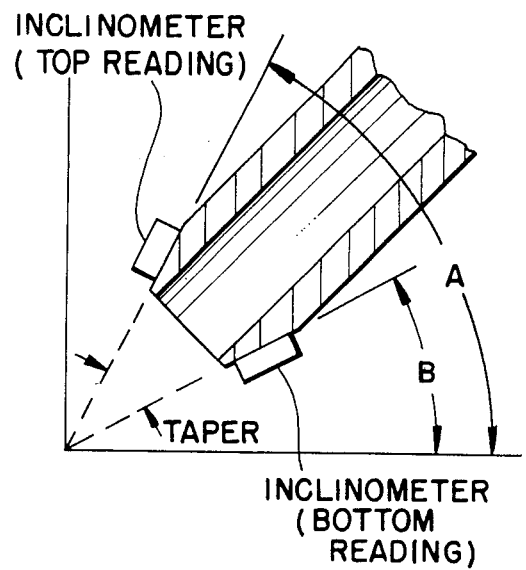
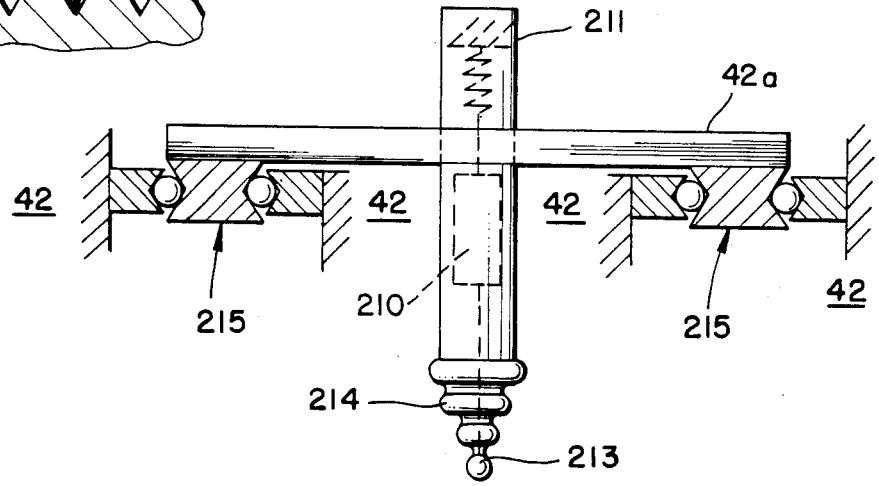

FIG. 5A.

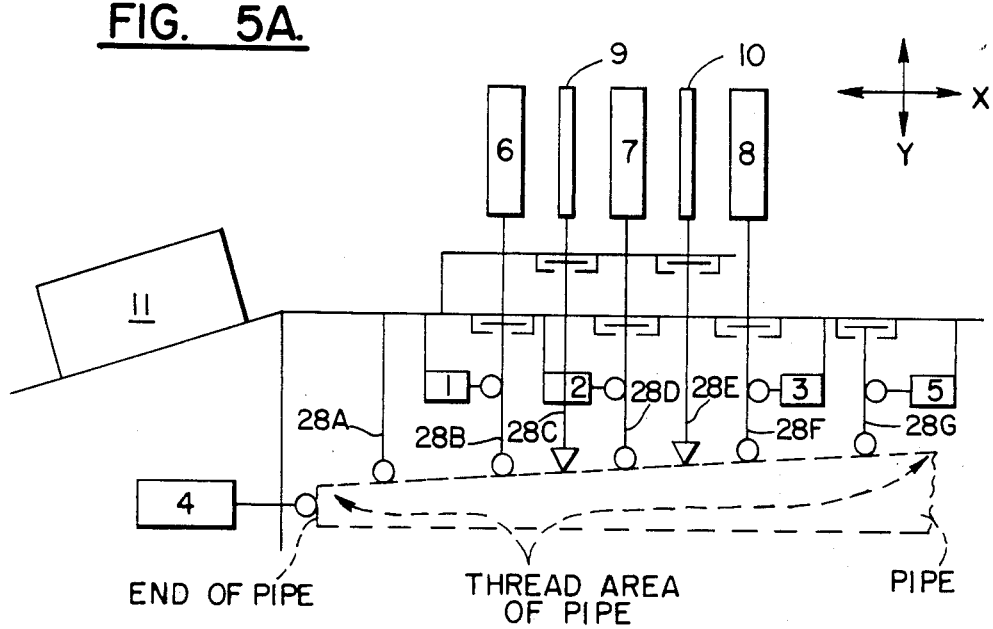

| TRANS-DUCER NO. | TYPE | FUNCTION | DESIG-NATION |
|---|---|---|---|
| 1 | LVDT | LEAD 1 ST. INTERVAL | $X_1$ |
| 2 | LVDT | LEAD 2 ND. INTERVAL | $X_2$ |
| 3 | LVDT | LEAD 3 RD. INTERVAL | $X_3$ |
| 4 | LVDT | STANDOFF | $X_4$ |
| 5 | LVDT | CUMULATIVE LEAD | $X_5$ |
| 6 | LVDT | PITCH LINE DEVIATION 1 ST. INTERVAL | $Y_1$ |
| 7 | LVDT | PITCH LINE DEVIATION 2 ND. INTERVAL | $Y_2$ |
| 8 | LVDT | PITCH LINE DEVIATION 3 RD. INTERVAL | $Y_3$ |
| 9 | LVDT | THREAD HEIGHT | $H_1$ |
| 10 | LVDT | THREAD HEIGHT | $H_2$ |
| 11 | INCLINO-METER | AVERAGE TAPER | I |

COMPUTATIONS

| | INTERVAL TAPER | LEAD J=1=TOP J=2=BOTT | DIA. DEVIATIONS (PITCH LINE NON-LINEARITY) | THREAD HEIGHT |
|---|---|---|---|---|
| TAPER J=1 = TOP READING<br>J=2 = BOTTOM READING<br>$T_{(0,0)}$ = AVERAGE TAPER<br>$T_{(0,0)} = 5(\tan I_{(1)} - \tan I_{(2)})$ | | $X_{(J,5)}$ CUMULATIVE | TOP ; BOTTOM | J=1 = TOP<br>J=2 = BOTTOM |
| TAPER 1ST. INTERVAL<br>$T_{(J,1)} = \left[\dfrac{Y_{(J,1)}}{1 - X_{(J,1)}}\right] + T_{(0,0)}$ | $T_{(1,1)} + T_{(2,1)}$ | $\dfrac{-X_{(J,1)}}{1.0}$ | $Y_{(1,1)} ; Y_{(2,1)}$ | |
| TAPER 2ND INTERVAL<br>$T_{(J,2)} = \left[\dfrac{Y_{(J,2)} - Y_{(J,1)}}{1 + X_{(J,1)} - X_{(J,2)}}\right] + T_{(0,0)}$ | $T_{(1,2)} + T_{(2,2)}$ | $\dfrac{X_{(J,1)} - X_{(J,2)}}{1.0}$ | $Y_{(1,2)} ; Y_{(2,2)}$ | $HO_{(J,1)} = .07125 - H_{(J,1)}$ |
| TAPER 3RD INTERVAL<br>$T_{(J,3)} = \left[\dfrac{Y_{(J,3)} - Y_{(J,2)}}{1 + X_{(J,2)} + X_{(J,3)}}\right] + T_{(0,0)}$ | $T_{(1,3)} + T_{(2,3)}$ | $\dfrac{X_{(J,2)} + X_{(J,3)}}{1.0}$ | $Y_{(1,3)} ; Y_{(2,3)}$ | $HO_{(J,2)} = .07125 - H_{(J,2)}$ |

$H_{(1,2)}$ = TOP THREAD HEIGHT ERROR AT 2ND THREAD HEIGHT LOCATION
$H_{(2,2)}$ = BOTTOM THREAD HEIGHT ERROR AT 2ND THREAD HEIGHT LOCATION
HO = ACTUAL THREAD HEIGHT
$H_{(1,1)}$ = TOP THREAD HEIGHT ERROR AT FIRST THREAD HEIGHT LOCATION
$H_{(2,1)}$ = BOTTOM THREAD HEIGHT ERROR AT FIRST THREAD HEIGHT LOCATION

NOTE:
.07125 = PERFECT OR THEORETICAL THREAD HEIGHT

THREAD INSPECTION

7" PIPE NO. 1

| INT. | TAPER (IN./IN.) | LEAD ERROR (IN./IN.) | |
|---|---|---|---|
| | | TOP | BOTTOM |
| 1 | .0640 | −.0032 | −.0014 |
| 2 | .0610 | .0007 | −.0000 |
| 3 | .0606 | −.0017 | −.0012 |
| 4 | .0637 | .0048 | .0019 |

CUM. LEAD ERROR (IN.)

| TOP | BOTTOM |
|---|---|
| .0004 | .0010 |

THREAD HEIGHT (IN.)

| LOC | TOP | BOTTOM |
|---|---|---|
| 1 | .0744 | .0714 |
| 2 | .0714 | .0704 |

AVERAGE TAPER (IN./IN.)

.0616

STANDOFF (IN./IN.)

| TOP | BOTTOM |
|---|---|
| .390 | .328 |

DIAMETER DEVIATION (IN.)

| LOC | TOP | BOTTOM |
|---|---|---|
| 1 | .0004 | .0004 |
| 2 | −.0002 | .0004 |
| 3 | −.0006 | .0001 |

PROFILE

THREAD MEASUREMENT TOOL

This application is a continuation of application Ser. No. 771,464, filed Aug. 29, 1985, now abandoned, which is a continuation of application Ser. No. 581,407, filed Feb. 17, 1984, now abandoned.

BACKGROUND OF THE INVENTION

This invention relates to devices for inspection and measurement of pipe threads and, more particularly, to the inspection of pipe threads utilized in oil-drilling equipment to determine that such threads are within tolerances.

Threaded couplings and the threaded end-portions of pipes are used for joining pipes together in numerous situations ranging from applications in the home to industrial applications. In certain situations, particularly in the case of oil-drilling equipment, pipes having a relatively large diameter and long lengths are employed. Such pipes require a correspondingly large area of thread to ensure adequate strength to a threaded joint. To ensure ease of joining such pipes, and to insure that the resulting joints will have adequate strength and will not leak, it is essential that the threads be made with sufficient precision to allow the threaded end-portion of a pipe to be properly threaded into a coupling.

A problem arises with respect to the inspection process for determining that adequate precision is present in the pipe thread, namely, that the process is not accomplished as readily as would be desired and that, furthermore, not all measurement parameters can be inspected by existing inspection equipment. The parameters of a thread which are useful in determining the accuracy of fit in a joint are discussed in the American Petroleum Institute Specification 5B. These include lead error, thread height error, pitch line non-linearity, average taper and interval taper. Reference is made to pp 2 & 14 of the API Specification for a discussion of the latter two parameters. The problem is compounded in that, heretofore, more than one article of measuring equipment needed to be employed in the measurement of these parameters while no commercially available equipment appears to be available for measurement of the pitch line non-linearity.

The following U.S. Patents are exemplary of the state of the art. A portable thread measuring device for measuring the distance of a pipe thread to the end of the pipe is taught in the Horton U.S. Pat. No. 4,184,265. Devices for measuring taper are shown in Dietrich U.S. Pat. No. 3,861,047, Mittenbers U.S. Pat. No. 3,047,960 and Possati U.S. Pat. No. 4,139,947. A device for measurement of pitch diameter of a thread is taught in Kaifesh U.S. Pat. No. 3,827,154, Peterson U.S. Pat. No. 2,937,458, Schasteen U.S. Pat. No. 4,202,109 and Heslin U.S. Pat. No. 3,271,872. A device for gauging the shape of threads is taught in Johnson U.S. Pat. No. 3,318,011. Devices for measuring thread diameter are taught in Reish U.S. Pat. No. 3,432,935.

SUMMARY OF THE INVENTION

The foregoing problem is overcome by measuring inspection apparatus which incorporates the invention so as to provide for the measurement and tolerance inspection of all of the foregoing parameters of pipe thread. This is accomplished by a single measuring device, or tool, comprising an assembly of probes and transducers.

It is thus an object of the invention to provide a measurement tool which is readily attached to a pipe thread to provide a set of readings of the foregoing parameters after which the tool is readily detached from the pipe to permit use of the pipe. Such readings can be taken simultaneously. The tool is able to take a multiplicity of thread measurements within the confines of one instrument. The tool also has the advantage of taking a wide range of pipe sizes and measuring both internal and external threads. The tool is capable of very accurate readings without a good deal of operator experience since it is an automatic system once properly set on the threads and activated and is a "hands off" system. This is because the operator is not required to have direct interaction with the sensor assembly during the taking of measurements. In fact, the operator need not have any direct interaction with the tool as a whole, once installed and activated, during the measurement phase. Furthermore, the pipe being measured does not need to be in a horizontal position for reliable readings since it can be measured in situ, or in its existing position.

In accordance with the invention, the measurement tool comprises a pair of arms configured as jaws for gripping the pipe or coupling, each arm having a handle on its end. One of the jaws contacts the outside surface of the threaded portion of a pipe or coupling while the other jaw contacts the inner surface of the pipe or coupling. The tool is readily held by its handle and the jaws are readily opened and closed to facilitate manual attachment and detachment of the tool from the thread being inspected.

In one embodiment, the tool includes an assembly of sensors and probes for detecting the positions of portions of the pipe thread. The sensor assembly is mounted on one of the jaws which also serves as a base for an inclinometer. The second jaw pivotably connects with the first jaw and terminates in a pair of contacts or legs which are placed against the other surface of the pipe wall to secure the tool from wobbling. The first jaw includes a pair of contacts or legs which are spaced apart in a direction parallel to the axis of the pipe being measured so as to secure the tool from any rocking motion relative to the pipe or coupling. The two legs on the first jaw and the two legs on the second jaw work in collaboration to assure stable support of the tool on the pipe.

Average thread taper is measured by the use of an inclinometer that is mounted on the first jaw. Taper measurement requires that two measurements be taken on the pipe thread; a first in the vicinity of the top of the circumference of the pipe and a second in the vicinity of the bottom of the circumference of the pipe. These two readings of the inclinometer are then subtracted from one another to provide the true taper of the thread. As is well known, such taper facilitates the insertion of the threaded end-portion of a pipe into a threaded coupling. Proper tolerances of such taper aids in the fitting of the pipe to the coupling.

Thread height error is obtained by a set of probes which comprise rod-shaped members slidably mounted within a cylindrical housing for movement perpendicular to the longitudinal axis of the pipe. The probes are pointed for insertion into the troughs of the threads. The probes are connected with transducers which measure such motion. In addition, each probe is mounted by a slide to the base of the first jaw so as to permit lateral, or transverse, motion in a direction generally parallel to the axis of the pipe for alignment of the terminus or tip of a probe with the low point of a trough. By use of more than one of the height measuring probes, it is possible to obtain a plurality of such measurements simultaneously for a more accurate determination of the thread height at various spaced intervals along the threaded length.

Additional probes are mounted by slides to the base of the first jaw for both longitudinal motion in a direction normal to the axis of the pipe as well as transverse motion in a direction parallel to the axis of the pipe. These additional probes are employed with transducers for measuring the transverse motion so as to obtain the value of the lead error of the thread. The probes utilized in the lead error measurement are terminated in ball (spherical) contacts which set within the troughs of the thread. The legs which support the first jaw along the thread are provided with ball contacts for insertion within the thread troughs. To this end, one of these legs is mounted in a sliding fashion to the first jaw so as to accommodate any lead error that might exist between these threads.

The non-linearity of pitch line of the thread is obtained by the use of probes displaceable in a direction normal (or radial) to the axis of the pipe which are terminated in ball-type contacts. For this purpose, it is advantageous to employ the two end legs for providing reference values of height at the ends of the base of the first jaw with the probes being utilized to provide intermediary values of radial displacement. Transducers are used to sense the displacement of the probes in the radial direction to provide a set of electrical signals representing the deviation of the pitch line from a straight line drawn between the two end legs. Such deviation is most useful in determining whether the thread of the pipe and the thread of the coupling will mate properly, or whether there will be high spots causing binding or low spots causing too loose a fitting with the ensuing loss of integrity and leakage.

A further feature in the construction of the assembly of the probes is the interleaving of the positions of the height error measurement probes with the lead error measurement probes within a plane containing the axis of the pipe so as to provide for a better distribution of the measurement sites for each of the foregoing measurements.

To facilitate the ensuing disclosure of the invention, the invention will be described with reference to taking measurements principally of the external thread of a pipe. However, it should be understood that the tool is not limited to external thread measuring applications. The tool is equally applicable to taking the same measurements on internally threaded, pipe. Indeed, it is considered an important advantage of the tool that it can be used randomly for measuring internally or externally threaded pipes without any change whatsoever to the tool.

BRIEF DESCRIPTION OF THE DRAWINGS

The aforementioned aspects and other features of the invention are explained in the following description taken in connection with the accompanying drawing wherein:

FIG. 3 is a sectional view of pointed probes 28C and 28E used in the thread height measurement including a transducer, the probe also being shown in FIG. 2;

FIG. 4 is a schematic illustration of the ball probes, such as probe 28D, used to measure the lead error, cumulative lead, and non-linearity of the pitch line.

FIG. 5a is a schematic illustration of the probes on the thread area of a pipe similar to FIG. 2, but in simpler form.

FIG. 5b is a chart showing the various LVDTs used in the tool shown in FIG. 2.

FIG. 6 is a schematic illustration of the average taper measurement.

FIG. 11 is a chart showing sample calculations of average taper, interval taper, lead error, non-linearity of pitch line and thread height error.

DETAILED DESCRIPTION

Figure 1:
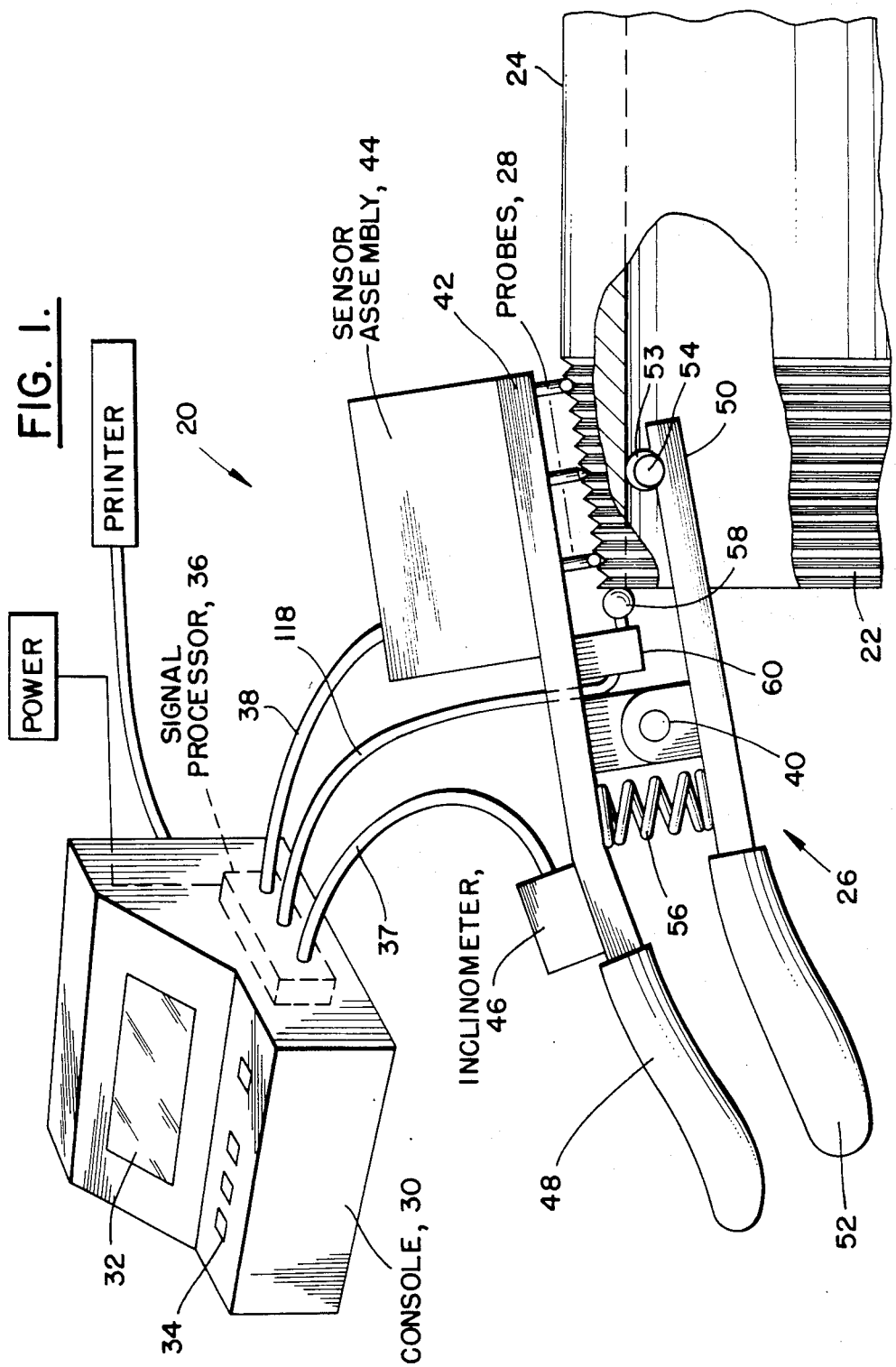
FIG. 1 is a stylized view of the measuring tool of the invention shown attached to the threaded portion of a pipe, and being connected to electrical circuitry for processing the signals received from the tool.
Figure 18:
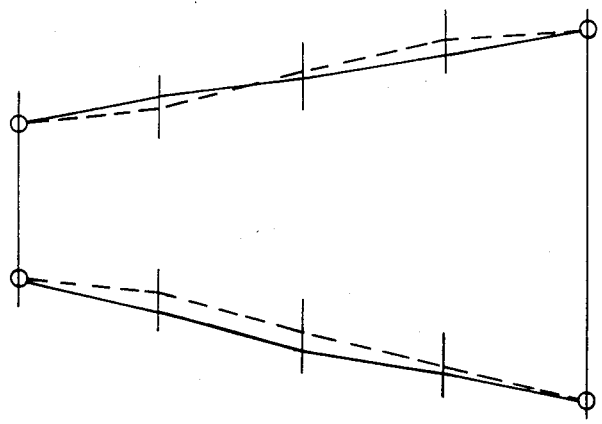
FIG. 18 shows a sample printout from the thread measurement system.

FIG. 1 shows a stylized view of a thread measurement system 20 for measurement of the characteristics of the thread 22 of a pipe 24. The system 20 includes a measurement tool 26 which incorporates the invention and comprises a set of probes 28 which contact the thread 22 for measuring the thread characteristics. Also included in the system 20 is a console 30 comprising a display 32 which presents information such as the characteristic being measured and the value of the measurement under control of push buttons of a keyboard 34 on the console 30. Also included in the console 30 is a signal processor 36 which is electrically connected via cables 37-38 to the tool 26 for extracting data from the signals detected by the probes 28. The data is coupled from the processor 36 to the display 32 for presentation to an operator of the system 20. A printer can also be coupled with the console to create a hard copy record of the measurements. A sample record produced by such a printer in conformance with the measurements of the various parameters as described hereinafter is shown in FIG. 18.

The tool 26 measures the following characteristics of the thread 22; the taper, the lead error, the height error, and the non linearity of the pitch line. Taper is the increase in the pitch diameter of the thread, in inches per foot, measured within an axial plane of the pipe 24. Lead is the distance from a point on a thread turn to a corresponding point on the next thread turn measured in an axial plane of the pipe 24 parallel to the longitudinal axis of the pipe. Height is the distance between the crest and the root, or trough, measured in an axial plane of the pipe 24 normal or perpendicular to the longitudinal axis of the pipe. These measurements and others may be taken simultaneously and, furthermore, may be taken while the pipe is in situ; that is, in its existing position such as being stacked for storage. As mentioned above, this description of the construction and operation of the tool 26 is being presented principally with respect to the measurement of the external thread of a pipe, it being understood that this description applies in an analogous fashion to the internal thread of a coupling (as shown in FIG. 14d).

The tool 26 is formed as a set of two arms which are hinged about a pivot 40 whereby the two arms can grip the thread 22 in the manner of a pair of jaws. The upper arm or jaw is formed as a base 42 which supports a sensor assembly 44 and an inclinometer 46, and terminates in a handle 48. The lower arm or jaw 50 terminates at its back end in a handle 52 opposite the handle 48.

The front end of the jaw 50, as may be seen in a cut away portion of the pipe 24, supports a pair of contacts 53-54 which, in this embodiment, have a rounded form and are spaced apart along a transverse plane of the pipe 24 for contacting the inner surface of the threaded portion of the pipe 24. A spring 56 is disposed between the base 42 and the lower jaw 50 for urging these two together for gripping the thread 22.

Figure 13:
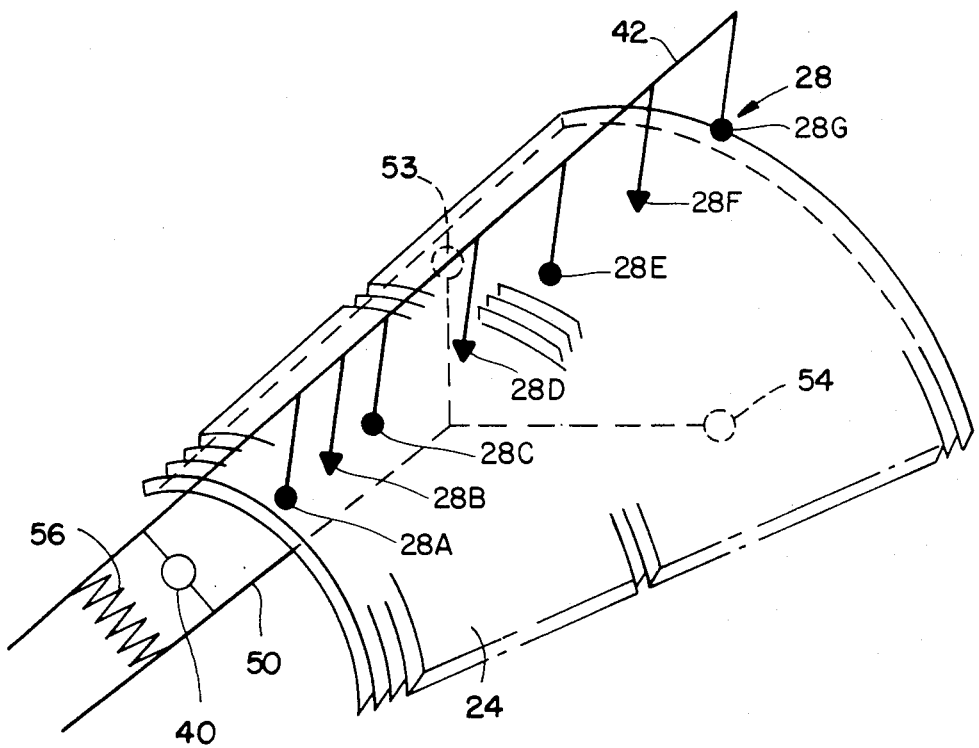
FIG. 13 is a schematic illustration of fragmentary portions of the pipe and tool showing the support arrangement of the tool when installed on an externally threaded pipe.

FIG. 13 shows one manner in which the tool is supported for taking measurements on an externally threaded pipe. Probes 28 are supported by base 42 and are aligned in a plane on one side of the pipe wall, the thread side, while contacts 53 and 54 (or loading balls) are supported by lower arm or jaw 50 of the tool on the other side of the pipe wall, the non-threaded side. Contacts 53 and 54 are located so as to substantially equalize the load on probe 28A and 28G and to eliminate any possibility of the tool rocking while measurements are being taken.

Figure 14A:
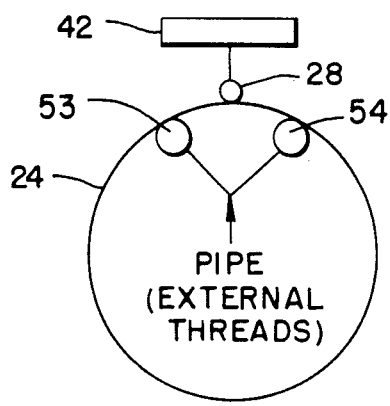
FIG. 14a is a schematic illustration of the tool and pipe in FIG. 13, but viewing it from the end of the pipe.
Figure 14B:
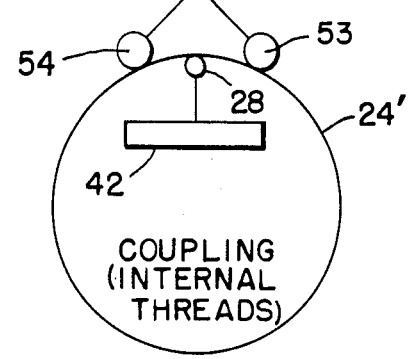
FIG. 14b is a schematic illustration of the same tool as in FIG. 14a, but installed on an internally threaded pipe.
Figure 14C:
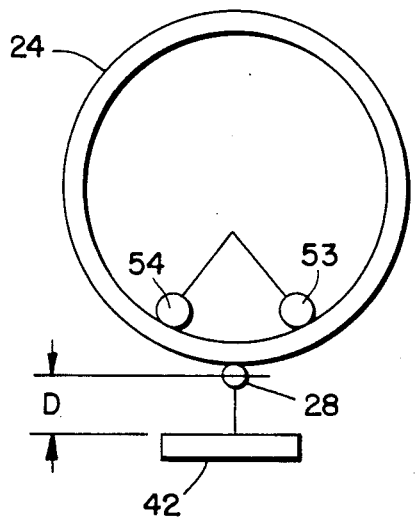
FIGS. 14c and d are side by side views similar to FIGS. 14a and b, respectively, showing that there is no change of distance between the 1st jaw and probes in using the tool for external and internal threads.
Figure 14D:
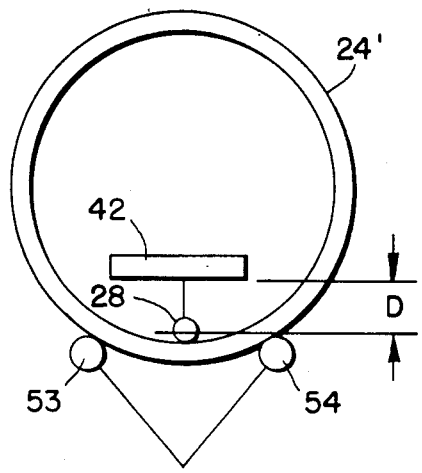

FIGS. 14a and b are views of the tool installed on external and internal pipe threads 24 and 24', respectively. It is seen that such an arrangement of contacts 53 and 54 with the probes has advantages when both internal and external threads are to be measured by the same tool. As seen in FIGS. 14c and d, the distance D and D' are nearly identical due to the motion of locating end support probes 28A and 28G in the plane of measuring probes 28B, C, D, E, and F.

Referring again to FIG. 1, the overall size of the tool 26 is sufficiently small so as to be readily carried about by a person measuring the pipe 24. The console 30 can be fabricated as a relatively large, stand-alone console, or, preferably can be fabricated as a miniaturized portable console that may be carried about with the tool 26 in a carrying case (not shown). The system 20 requires only that the person manually attach the tool 26 to the thread 22, and that he signify, via the keyboard 34, the values of relevant parameters and what measurements are to be presented on the display 32. Such automatic operation of the measuring steps enables very accurate readings to be taken each time the tool is used and operator experience does not enter as a factor into such accuracy. In this respect, the tool is a "hands off" system.

Figure 2:
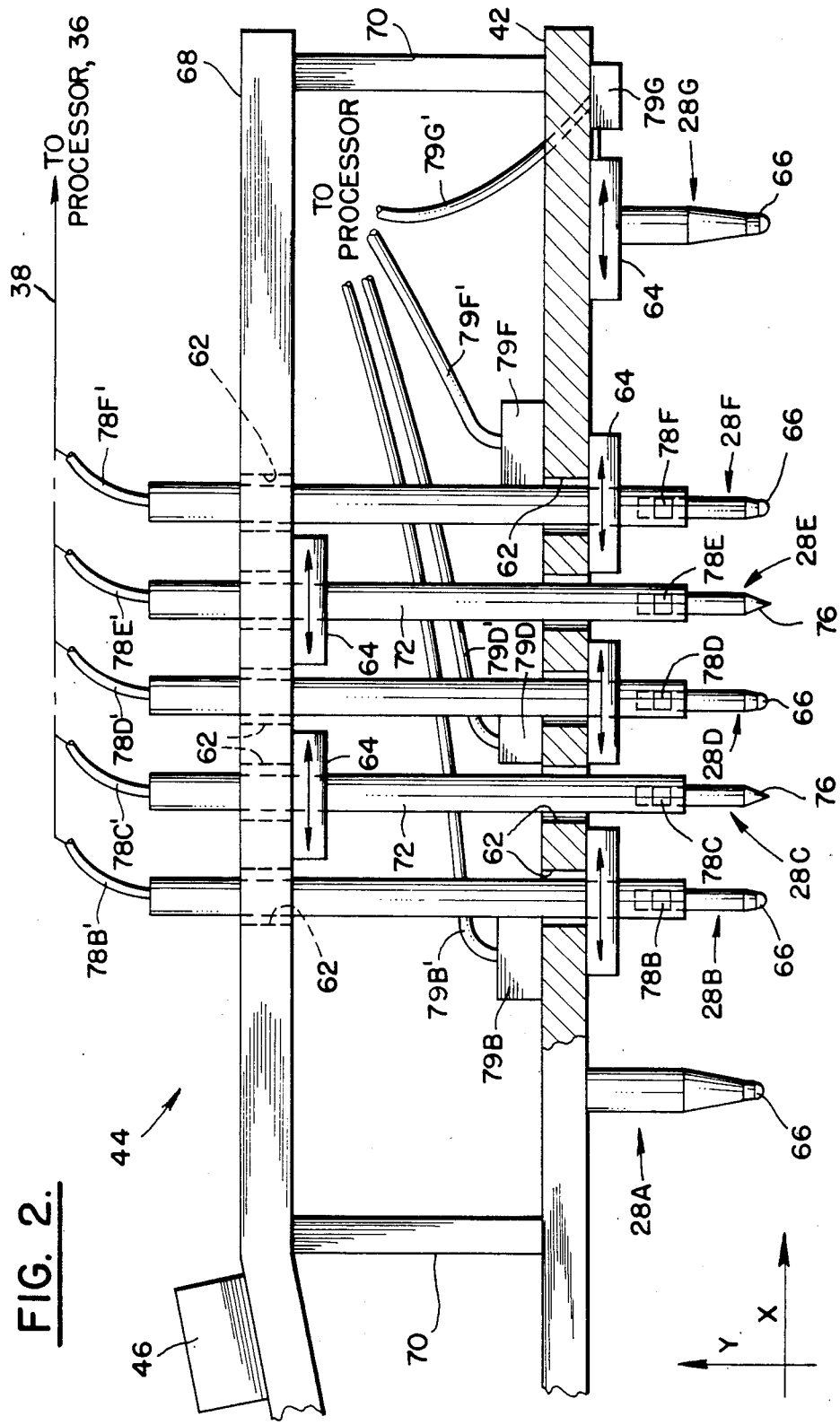
FIG. 2 is an enlarged fragmentary view of the tool of FIG. 1, FIG. 2 showing a detailed arrangement of the components of a sensor assembly of FIG. 1.

In accordance with the invention, the set of probes 28 extend downwardly from the sensor assembly 44 within an axial plane of the pipe 24 to contact the thread 22. The end ones of the probes (28A and 28G) serve as legs for support of the base 42 and the assembly 44 upon the thread 22 to counteract the force of the spring 56. A horizontal bumper probe 58, FIG. 1, extends from a transducer 60 supported beneath the base 42 and abuts the end of the pipe 24 for designating the position of the tool 26 relative to the end of the pipe. Probe 58, which can be similar to probes 28B, D and F, provides standoff for the tool when being located on the pipe by the operator. The standoff probe determines how far from the end of the pipe the first probe, for example, probe 28A in FIG. 2, is located.

A description of how the stand off system operates as the operator places the tool onto a pipe is now described. The operator grasps handles 48 and 52 (FIG. 1) and squeezes them together so as to open jaws 42 and 50. The operator then places the open jaws onto the area of the pipe carrying the thread to be measured. The jaw portion of the tool is placed on the pipe wall, the base 42 of the first jaw being adjacent the threaded or outside portion of the pipe and the contacts 53-54 of the jaw adjacent the inside wall of the pipe. The jaw portion is slipped over the end of the pipe wall by the operator until stand off pin 250 contacts the end of the pipe.

Figure 17A:
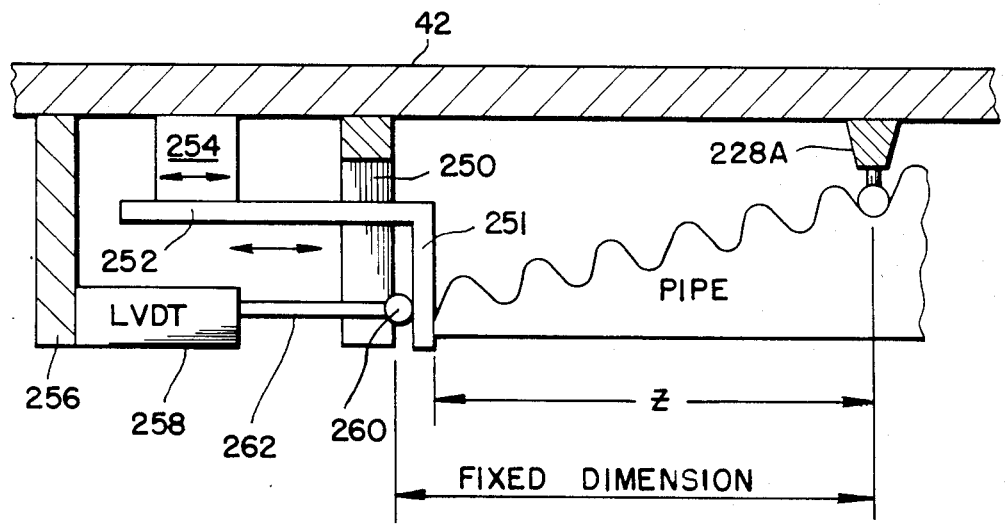
FIG. 17a shows the standoff system of the tool when the standoff ball probe falls within the established range of the standoff mechanism.
Figure 17B:
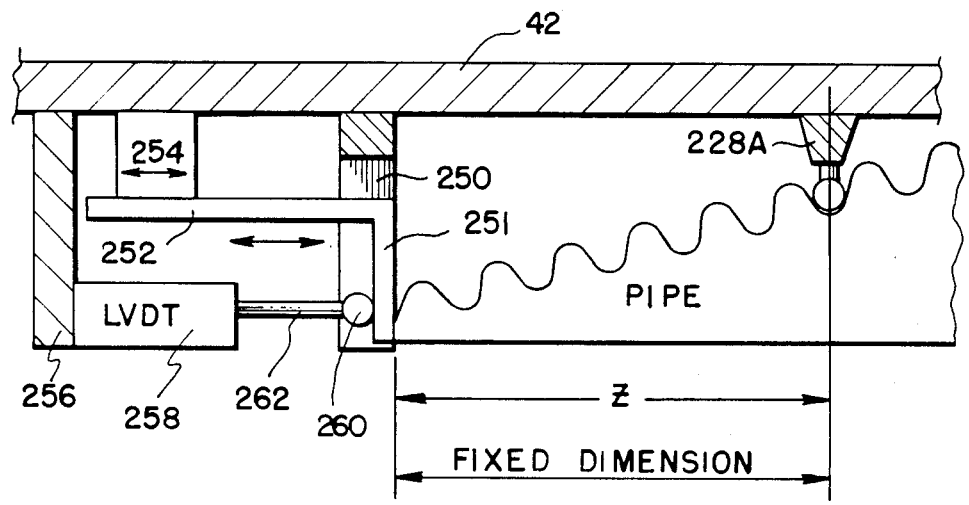
FIGS. 17b and c show the standoff system of the tool when the standoff ball probe falls outside the established range of the standoff mechanism.
Figure 17C:
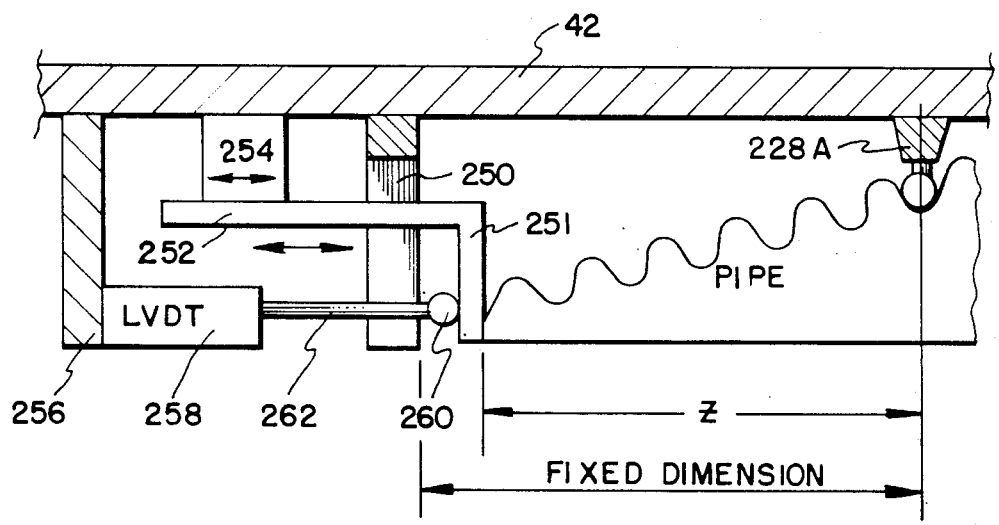

Stand off pin 250, which can be a pair of pins as shown in partial cutaway fashion in FIGS. 17a-c, is fixedly mounted to base 42. The stand off transducer 60 and bumper probes 58 shown in a general fashion in FIG. 1 can be of any suitable type such as that depicted in FIGS. 17a-c. For instance, transducer 258 can be an LVDT type similar to transducer 78 shown in FIG. 2 which has a core attached to probe tip or ball 260, by rod 262. The transducer 258 is rigidly mounted onto bracket 256 which in turn is rigidly mounted onto base 42. It is noted that the mechanism and pipe are not necessarily drawn to scale in FIGS. 17a-c.

In addition to LVDT 258, the stand off mechanism shown in FIGS. 17a-c also includes a stand off member 252 which is slideable relative to stand off pin 250 as depicted by the arrows. Stand off member 252 has a pipe contact portion 251 which can be biased by LVDT probe ball 260 generally located on the right side of standoff pin 250 (FIGS. 17a and 17b) as the tool is being placed on the pipe. Stand off member 252 is adapted to be translatable through slide 254 which is rigidly mounted on base 42. Slide 254 can be any suitable type such as the slide 215 depicted in FIG. 4.

As stand off pin 250 approaches the end of the pipe, portion 251 of stand off member 252 is located in a position just ahead, or to the right in FIGS. 17a-c, of stand off pin 250, being maintained in this position by probe ball 260. Thus, stand off member 252 first contacts the end of the pipe as the operator installs the tool. Then, as the operator places the tool farther onto the pipe, stand off pin 250 will come into contact with the end of the pipe thereby preventing any further movement of the tool in such direction. During this time, portion 251 of stand off member 250 is pushed to the left relative to the stand off pin and base by the pipe end enabling portion 251 of member 252 to reach the position shown in FIG. 17b.

After the stand off pin contacts the end of the pipe, the operator releases his grip on handles 48 and 52 allowing the jaws to come together and seat themselves on the pipe. As this occurs, the tool's fixed probe, such as probe 28a, seats itself into an adjacent trough of the thread. If the position of the ball probe 260 falls outside of an established range when probe 28a seats itself in the trough of the thread, then the operator receives a signal to reposition the tool. In this case, transducer input data is void and the program stops until the tool is properly repositioned within the measuring range.

FIG. 17a represents the position of the standoff mechanism when the tool is positioned properly. FIGS. 17b and 17c represent out of range conditions. The "Z" dimension shown in FIG. 17a is the distance from the nose of the pipe to the fixed probe 28a resting or seated in a good thread trough. In the case where out of range conditions exist (17b & 17c), when the operator repositions the tool, the fixed probe 28a moves accordingly.

As an example of the three conditions shown in FIGS. 17a-c, it is assumed that the "fixed dimension" is 0.500 inches. In FIG. 17a, Z is equal to or greater than 0.320 inches and equal to or less than 0.500 inches. In FIG. 17b, the standoff mechanism is out of range since Z is greater than 0.500 inches. In FIG. 17c, the standoff mechanism is also out of range since Z is less than 0.320 inches. All dimensions recited above are approximate.

Upon receiving the signal to reposition the tool, the operator must move the tool either left or right relative to the pipe (FIGS. 17a-c). Assuming the condition shown in FIG. 17b exists, the operator must move the tool to the left relative to the pipe. As the operator repositions the tool, the fixed probe will move to the left towards the end of the pipe to seat itself, such as in the next trough. In so doing, the tool, base 42 and stand off pin 250 move to the left from the position shown in FIG. 17b to the position shown in FIG. 17a.

As stand off pin 250 moves to the left, the LVDT which biases ball tip 260 to the right keeps stand off member 252, particularly portion 251, in contact with the end of the pipe. There is sufficient stroke in the LVDT to accommodate probe 28a moving one full thread spacing. The position that ball tip 260 reaches as the tool is shifted to the left to seat the fixed probe in the trough is measured by the core of the LVDT 258. This determines how far from the end of the pipe the fixed probe, such as probe 28a, is located.

As the fixed probe seats itself in the trough, the other probes also seat themselves in adjacent troughs and contacts 53-54 (FIG. 1) come into contact with the other side of the pipe wall. At this time, the tool is fully installed on the pipe in a proper manner and the operator activates the electronic control unit to take the thread measurements which may be printed out of a printer in the hard copy form, e.g., paper, shown in FIG. 18.

FIG. 2 shows an enlarged view of one embodiment of the sensor assembly 44 previously described with reference to FIG. 1. In this embodiment, there are seven probes which are further identified by the legends A-G. The probe 28A is the end probe fixed in position on base 42 and the probe 28G is an axially movable end probe (moves generally in the direction of the pipe axis). These two probes serve as supporting legs as was noted with respect to FIG. 1. Probes 28A and 28G contact the threads and, although shown as end probes in FIG. 2, can be located in any convenient position relative to each other and relative to the other probes on the tool as long as they can provide their intended support function. The probe 28G is secured to the base 42 by means of a slide 64 which permits axial displacement in a general direction noted by the arrow. The displacement is generally in the axial plane of the pipe 24 and slides suitable for use as the slide 64 are available commercially. The probes 28A and 28G are provided with ball points 66 to facilitate location of the probes 28A and 28G within the troughs of the thread 22.

The slide 64 permits the probe 28G to be displaced axially permitting alignment of the probes 28A and 28G with the precise spacing actually existing between troughs of the thread 22. Thereby, the probes 28A and 28G can serve as legs for securely supporting the base 42 and the assembly 44 upon the thread 22.

The assembly 44 further comprises an upper deck 68 supported by posts 70 upon the base 42. The probes 28B-F pass through enlarged apertures 62 in both the base 42 and the deck 68. The probes 28B-F are supported by slides 64 disposed in alternating fashion upon the base 42 and the deck 68, this alternating arrangement providing space for implacement of the slides 64 among the probes 28B-F. Each of the slides 64 permits sideways movement of their respective probes 28 while holding the housings 72 of the respective probes 28 against vertical motion relative to the base 42. Each of the probes 28B-F include an extensible rod which can move vertically within the respective housing 72 for engagement of the probes with the thread 22. The tips of all the probes shown in the embodiment of FIG. 2, with the exception of probe 28A, can move in the X direction. The tips of all the probes of FIG. 2, with the exception of probes 28A and 28G, can also move in the Y direction. The amount of tip movement in the X direction is measured for probes 28B, 28D, 28F and 28G. The amount of tip movement in the Y direction is measured for probes 28B-F.

The probes 28B, 28D and 28F are each provided with the ball points 66 so as to be centered within the troughs of the thread 22 at the pitch line. The probes 28C and 28E are provided with retractable points 76 (to be described further hereinafter) for contacting the root, or base, of the respective troughs upon making contact with the thread 22. The slides 64 permit the points 76 to be displaced sideways or parallel to the axis of the pipe so as to find the roots of the thread 22.

The assembly 44 further comprises a set of transducers 79, individual ones of which are connected to respective ones of the probes 28B, 28D, 28F and 28G for detecting the amount of sideways displacement and, therefore, providing data as to the precise location of each of these probes. The transducers 78 and 79 can be of any suitable type, such as an LVDT or Linear Variable Differential Transformer which is a standard device used in measurement applications. The AG Series transducer sold by Sangamo Transducers of Grand Island, N.Y. is one type suitable for this application. They provide electric signals via lines 78B′–78F′ and 79B′–79F′ to the processor 36, these signals being linearly related to the displacement of the respective probes 28 generally in or perpendicular to the axial plane of the pipe 24. The transducers 78 and 79 are shown schematically in FIG. 2. Transducers 79 may be mounted in staggered fashion upon the base 42 and the deck 68 so as to provide space for all the transducers among the probes 28 and the slides 64.

All of the probes 28 are disposed along a common axial plane which preferably bisects the distance between the two contacts 53–54 (FIGS. 1, 13, and 14) to provide for a stable mounting of the assembly 44 upon the thread 22, the contacts 53–54 preventing a lateral rocking while the probes 28A and 28G preventing a longitudinal rocking. Each of the probes 28B–F contain electric leads which fan into the cable 38 for connection of the signals of these probes to the signal processor 36.

With reference now to FIGS. 3, 4, and 5, there is provided a more detailed description of the configuration of the linear displacement transducers employed in the transducers 78 and 79 as well as in the probes 28B–F. The construction of probes 28C and 28E, which measure thread height is shown in detail in FIG. 3. The probe assembly has a floating tip 202 which seats into the root trough of the thread assembly. As the tool is placed on the pipe thread, reference surface 204 rests or seats itself on the top or crest of the thread. Surface 204 is on floating thread crest standoff collar 206.

Collar 206 is mounted on LVDT case 208, such as by the screw shown, which contains LVDT core 210 which generates a signal indicative of the thread height error. Tip 202 is connected to the LVDT core 210 so that after collar 206 is positioned on the thread top, the tip seats itself in the thread trough. The tip's position locates the LVDT core relative to its case and generates the thread height error signal, a zero signal indicating that the thread height has no error therein.

The LVDT case 208 is slideably mounted on an LVDT guide 212, such as by a slip fit, so that as the tool is placed on the pipe, collar 206 adjusts itself relative to guide 212 to come to rest on top of the threads. Guide 212, which is mounted on the frame of the tool, such as to base 42 or upper deck 68, has a hollow housing 211. The guide does not move in the vertical direction relative to the base 42. The LVDT case 208 is securely mounted to bearing 209 which is able to ride up and down inside the hollow of the guide. Guide 212 also contains a spring 207 which biases the LVDT case 208 downward towards the pipe, the upper and lower limits of the case's movement, or its stroke, being limited by dog 205 in slot 203 of the guide. Spring 207 is held in the guide by adjustable spring bushing 201.

FIG. 4 is an illustration of the probe configuration that is used for probes 28 B, D, & F which are ball probes as opposed to pointed probes. Here, the LVDT case 211 is securely mounted against movement in the vertical direction to the frame of the tool, such as on base 42 or deck 68. The probe ball is attached to the LVDT core 210 so that the position of LVDT core 210 relative to LVDT case 211 is determined by the position at which the ball comes to rest on the pipe. This position generataes a signal, as in FIG. 3, which indicates the pitch line error, a zero signal meaning that the pitch line has no error. The connecting member above the ball has a protective cover 214.

FIG. 4 also illustrates the manner in which the probe is mounted for sideways movement, if needed, to locate ball 213 into the trough of the thread. Ball slide or positioning assemblies 215 are fixedly mounted on the farame of the tool, such as on deck 42 or deck 68, so that such motion can be accomplished.

Any suitable ball slide or positioning slide assemblies can be used for this purpose such as those supplied by Del-Tron Precision, Inc., of Brookfield, CT. In the configuration shown in FIG. 4, the slide assemblies 215 are mounted onto the frame of the tool to provide sideways (horizontal) motion to the probes while LVDT case 211 is fixed to a member 42a which is mounted on the slide assemblies 215. In this manner, the LVDT case 211 is restrained from vertical movement relative to the frame of the tool, but can adjust itself horizontally or generally sideways of the frame to enable the probe tip or ball to seat itself in the trough of the thread. A similar arrangement for sideways movement can be used for probes 28B–G.

Ball probe 28A is fixed to the frame of the tool, such as to base 42 as shown in FIG. 2, and its ball 66 is not permitted to move up or down or sideways relative to the tool since, in addition to being a support leg, it provides a fixed reference position for the tool when it seats itself into the trough of a thread. Ball probe 58, which acts as a bumper probe, as described earlier, is connected to an LVDT unit which is also tied into the signal processor 36.

The standoff pin places probe 28A into the vicinity of a full thread such as the first full thread on the pipe as the tool is placed on the pipe by the operator. The ball of probe 28A will slide down into the actual location of the trough of the first full thread as the operator releases his grip on the handles 48 and 52. Since probe 28A is fixed to the tool without any movement permitted therebetween, as ball 66 of probe 28A is shifted sideways to seat itself in the trough of the first full thread, it also shifts the entire tool with it.

Once probe 28A is properly seated, LVDT 60 is relied upon to provide an accurate reading of standoff; that is, the distance between the end of the pipe and first full thread. Also, as the operator releases his grip on handles 48 and 52, the other probes 28B–G seat themselves in the troughs of threads, each being able to move sideways as needed to seat properly in the adjacent thread trough by virtue of its slide positioning assembly.

Referring again to FIGS. 1 and 2, it is seen that the tool also has an inclinometer 46 located on base 42. This is used to determine average thread taper. Any suitable type of inclinometer may be used for this purpose; for instance, an inclinometer from Transducers and Systems, Inc. of Branford, CT which is capable of operating in upright and inverted positions.

FIGS. 5a and 5b are intended to be used together for the purposes of the following description. FIG. 5a is a very simplistic illustration of the tool shown in FIG. 2, but emphasizing the probes, LVDTs and inclinometer. It is to be understood that the transducers 1, 2, 3, 5, 6, 7, 8, 9 & 10 of FIGS. 5a and b are equivalent to the transducers (LVDTs) 79B, 79D, 79F, 79G, 78B, 78D, 78F, 78C and 78E, respectively, in FIG. 2. Transducer 4 in FIGS. 5a and b is equivalent to LVDT 60 in FIG. 1. Inclinometer 11 in FIGS. 5a and b is equivalent to inclinometer 46 of FIGS. 1 and 2.

The relationship between the transducers and probes in the tool and the various aspects of the thread being measured are clearly associated in FIG. 5b. It is seen that all of the transducers are of the LVDT type in this embodiment. It is also noted that transducers 1–3 measure the lead error, $X_1$, $X_2$ and $X_3$; transducer 4 measures the standoff position, $X_4$; transducer 5 measures the cumulative lead error, $X_5$; transducers 6–8 measure the pitch line deviation or non-linearity of the pitch line, over four intervals of the thread, $Y_1$, $Y_2$ and $Y_3$; and transducers 9 and 10 measure the thread height error, $H_1$ and $H_2$. Average taper, I, is measured by inclinometer 11.

Comparing FIGS. 3 and 4 to FIG. 2, it is noted that the structure of FIG. 3 is used with probes 28C and 28E while the structure of FIG. 4 is used with probes 28B, 28D and 28F. Thus, the reference surface 204 of the collar 206 of the thread height measuring assembly in FIG. 3 contacts the crests of the thread 22 while the point 76 is urged further into the root of the thread 22. The electrical signals of the transducers 78C and 78E are operatively connected to probes 28C and 28E and indicate the displacement of the point 76 relative to the collar 206 and case 208 and, accordingly, the height error of the thread 22. In the case of the probes 28B, 28D and 28F, the transducers 84 are more directly supported by the slides 64. The location of a trough of the thread 22, as sensed by a ball point 66, relative to the base 42 is indicated by the output signals of each of the transducers 78B, 78D and 78F of the probes 28B, 28D and 28F, respectively. It is noted that with respect to the probes 28B, 28D and 28F, the base 42 serves as a reference plane due to the supporting of the base 42 upon the probes 28A and 28G.

A better appreciation of the thread measuring technique provided by the tool in accordance with the invention can be had by reference to FIGS. 7 to 11 in conjunction with the following description. All types of threads can be measured with the tool; for example, pipe threads, screw threads, helical cams, etc. However, for the purposes of this description, the measurement technique is described in conjunction with 8 round thread as set out in Supplement 1 to API Std 5B (Tenth Edition) "Specification for Threading, Gaging, and Thread Inspection of Casing, Tubing and Line Pipe Threads,38 issued in March, 1980 by the American Petroleum Institute, Production Department, 211 N. Ervay, Suite 1700, Dallas, TX 75201. This Supplement is incorporated herein by reference in its entirety.

Figure 7:
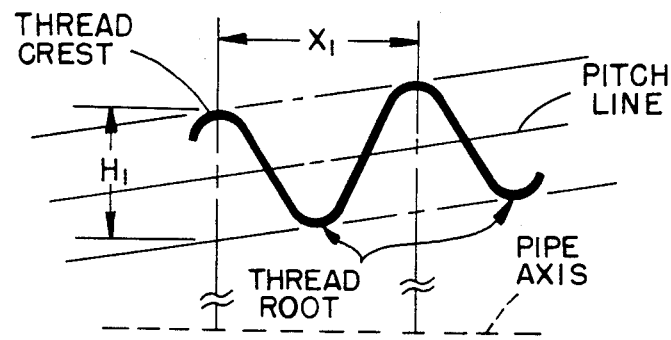
FIG. 7 is a graphical illustration of an example of a theoretical pipe thread profile depicting various aspects of the thread.
Figure 8:
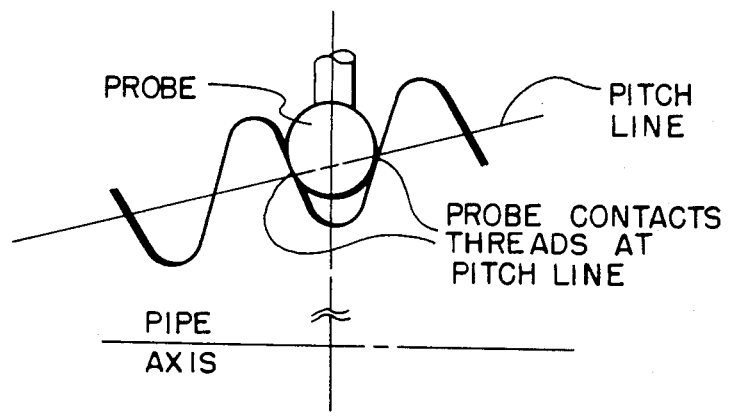
FIG. 8 is a graphical illustration of the same thread profile show in FIG. 7, but also depicting a ball-type probe seated in the trough of the thread.

Table 2.9, page 11, of this specification contains a graphical depiction of 8 Round thread profile. FIG. 7 depicts the same thread in an abbreviated graphical form for clarity in conjunction with this disclosure. Thread taper is defined as the increase in pitch diameter of the thread in inches per foot of thread. Thread lead is defined as the distance from a point on the thread turn to a corresponding point on the next thread turn measured parallel to the thread axis and shown as "$X_1$" in FIG. 7. Thread height is the distance between the crest and root normal to the axis of the pipe and depicted as "$H_1$" in FIG. 7. FIG. 8, which is similar to FIG. 7, shows how the ball probes used in the tool interact with the threads when placed in the troughs of the threads for taking a measurement. The size of the ball is matched to the type of thread being measured and the probe contacts the thread flanks on the pitch line as shown.

Figure 9:
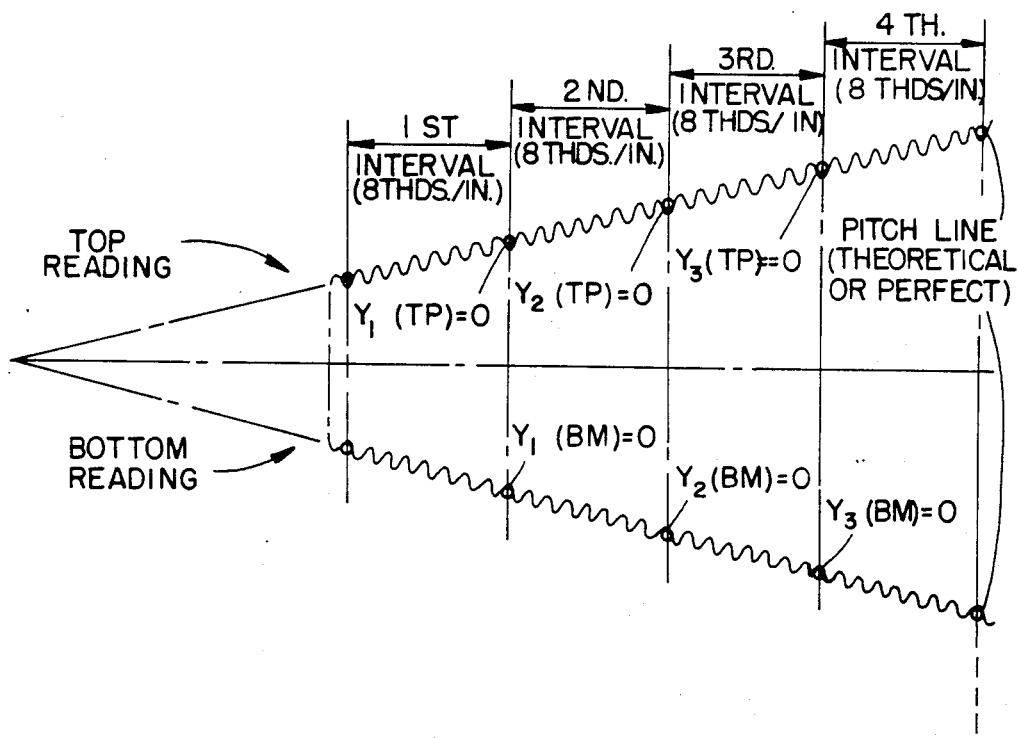
FIG. 9 is a graphical illustration of a theoretical pipe thread profile showing four intervals of measurement used to determine if non-linearity of pitch line exists.

The measurement of pitch line deviation is possible by the tool in addition to taper, lead error and height error measurements. Pitch line deviation or non-linearity of pitch line, is defined as the deviation of the pitch line from a straight line drawn between the ends of the interval of threads measured by the tool. From top and bottom pitch line or diameter deviation readings taken by the probes on the tool, a profile of the pitch line can be developed. No other method of accomplishing a true profile of the pipe pitch line is known other than rotating the pipe on a contour profilometer which is impractical in most cases. As shown in FIG. 9, a hypothetical 8 Round pipe having external threads is being measured by the tool. In this case, the tool is shown as having four segments or intervals over which the pitch line deviation is being measured, the intervals being designated 1st through 4th. Each interval is one inch in length and since, in this embodiment, 8 round thread is being measured, there are eight full threads in each interval.

Figure 10:
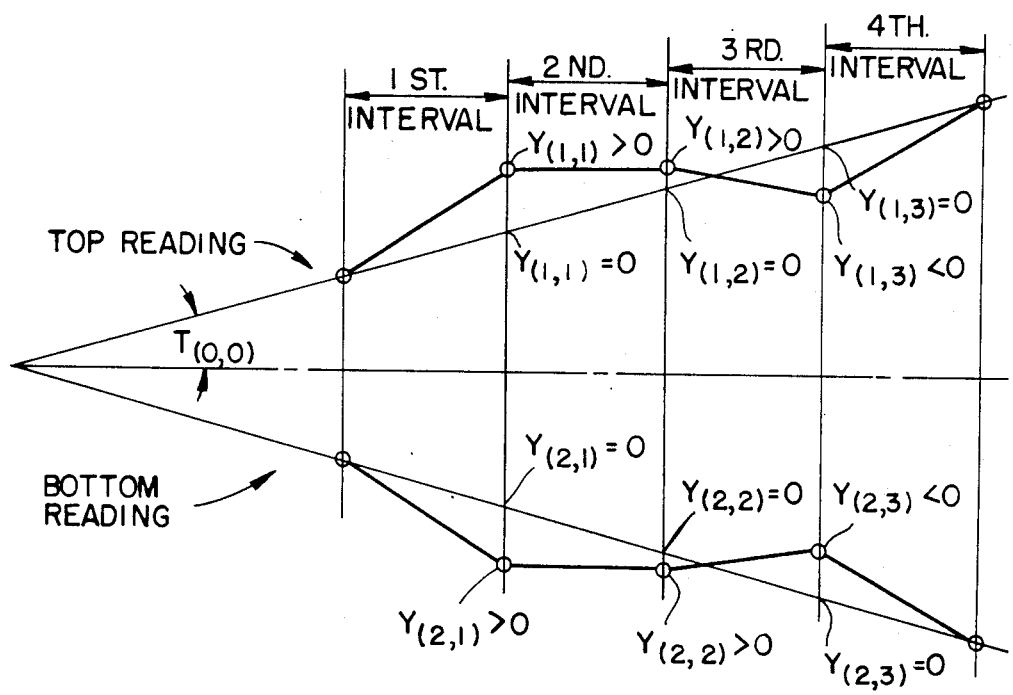
FIG. 10 is a graphical illustration, (without the thread being shown) of the same four intervals of measurement as in FIG. 9, but in an actual pipe wherein there exists pitch line non-linearity.

FIG. 9 depicts a theoretical condition for the pitch line; that is, there is absolutely no pitch line deviation and the pitch line is linear. FIG. 10, on the other hand, depicts the same three intervals being measured in a pipe thread wherein there is pitch line deviation. The "theoretical" or perfect pitch line is also shown in FIG. 10 for reference purposes. In both FIGS. 9 and 10, the two readings carried out by the tool are on the top and bottom of the pipe and are so marked "top reading" and "bottom reading". The tool readings obtained from the four intervals determine the non-linearity of the pitch line and can create a profile of the actual pitch line which FIG. 10 essentially represents.

One tool reading may be taken for lead error, thread height error, and pitch line deviation at any circumferential location on the pipe measured. When pipe thread taper is to be also measured, there must be two readings taken. The second reading is angularly displaced from the first. For instance, the first and second readings can be generally opposite one another. FIG. 6 depicts the approach of measuring average taper, the pipe being measured in this embodiment having an external thread. The pipe length does not have to be in a horizontal position for accurate measurements to be taken. The tool can be placed on the pipe in any convenient position to take measurements. The tool, for example, may be installed on the pipe in the vicinity of the top dead center and bottom dead center positions, (the 12 and 6 o'clock positions, respectively) of the pipe end if measurement of average taper is desired. For instance, the proper positions could be plus or minus 10 degrees, and preferably plus or minus 5 degrees, of top and bottom dead center positions. An instrument for this purpose which can be made part of the tool system is shown schematically in FIG. 12. Such an instrument includes sensors which indicate that the instrument is within the proper measuring position on the top and bottom of the pipe. The sensors can be four mercury switches, switches 216 and 217, to control the top reading position of the tool and switch 218 and 219 to control the bottom reading position of the tool. Any suitable type of switch can be used for this purpose; for instance, mercury switches having the part number 3677 supplied by Durakool, Inc.

Figure 12:
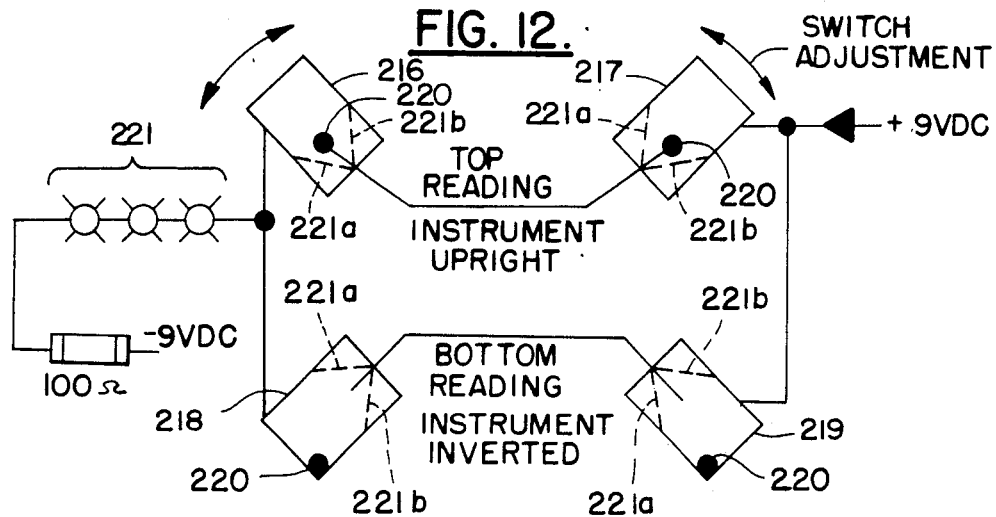
FIG. 12 is a schematic illustration of an instrument to assure proper placement of the tool in the pipe.

The angle of the switches relative to the tool, such as the angle from vertical, can be made adjustable as shown in FIG. 12 to precisely control the proper measuring positions of the tool on the pipe. Each switch has a movable contact 220 that only completes the circuit through the switch when the movable contact hits fixed contacts 221a or b. When this happens, the 9 volts coming into the switches passes through the switch wherein contact was made and carries the voltage to a display, such as LEDS 221, to light them up and indicate an improper positioning of the tool. Thus by properly setting the angle of the switches on the tool so that when the tool is outside the desired range of positions for proper measurement, such as when a top reading is desired, the LED will be lighted by either switch 216 or 217 and the operator can be automatically notified that a repositioning of the tool is required.

As can be seen from FIG. 12, as the tool is inverted between the top and bottom readings, switches 216 and 217 become inactive and switches 218 and 219 become active. When the tool is switched from bottom to top position readings on the pipe, switches 218 and 219 become inactive and switches 216 and 217 become activated in controlling the LEDs.

The tool, when seated on the pipe thread, is supported in position on the thread side by probes 28A and 28G basically. Since probe 28A is fixed relative to the frame, the reading on the inclinometer depends upon the seating of probe 28G. As shown in FIG. 6, the inclinometer is read while the tool is in both the top and bottom positions in order to provide an average taper measurement. In the top position, the inclinometer generates a signal equivalent to its angle relative to the horizontal or parallel to the axis of the pipe shown as "A" in FIG. 6. Then, in the bottom position, it generates a second signal again equivalent to its angle relative to the horizontal or parallel to the axis of the pipe and shown as "B" in the same Figure. These signals are sent to the processor 36 where by are subtracted from one another to thereby produce the average taper of the pipe thread. The computation leading to the average taper $T_{(0,0)}$ of the pipe thread is shown in the first column of FIG. 11.

The interval taper is also calculated according to FIG. 11. For example, the actual taper over the 1st interval is designated as $T_{(1,1)}+T_{(2+1)}$. It is calculated by the signal processor by taking the reading of transducer 6, FIG. 5, and dividing by unity minus the reading from transducer 1 and this quotient is then added to the average taper $T_{(0,0)}$. As mentioned above, a zero reading on the transducers, in this case transducers 6 and 1, is indicative that there is not any error in these readings and, thus, the 1st interval taper would equal the average taper. It is understood that the number of intervals may vary in accordance with specific measurement requirements.

Either or both of the transducers could indicate a positive value error or a negative value error. For instance, referring to FIG. 10, transducer 6 would indicate a positive value greater than zero since the actual taper for this 1st interval is greater than theoretical or zero value. Conversely, in the 3rd interval, transducers 8 would indicate a negative value less than zero since the actual taper for the 3rd interval is less than theoretical or zero value. This is indicated by "$Y_{(1,3)}<0$" and "$Y_{(2,3)}<0$" at the actual values. For reference purposes only, FIG. 11 also shows the theoretical values for each interval.

The chart in FIG. 11 which is to be read in conjunction with FIG. 5, also shows the calculations for cumulative lead, lead in each of the intervals, pitch line non-linearity and thread height. It is seen that the reading of transducer 5 gives a cumulative lead value; the readings of transducers 1, 2, and 3 develop the leads for the 1st, 2nd, 3rd and 4th intervals, respectively; the readings of 6, 7, and 8 develop the pitch line non linearity; and the readings of transducers 9 and 10 develop the thread height, all in conformance with the computations shown.

Figure 15:
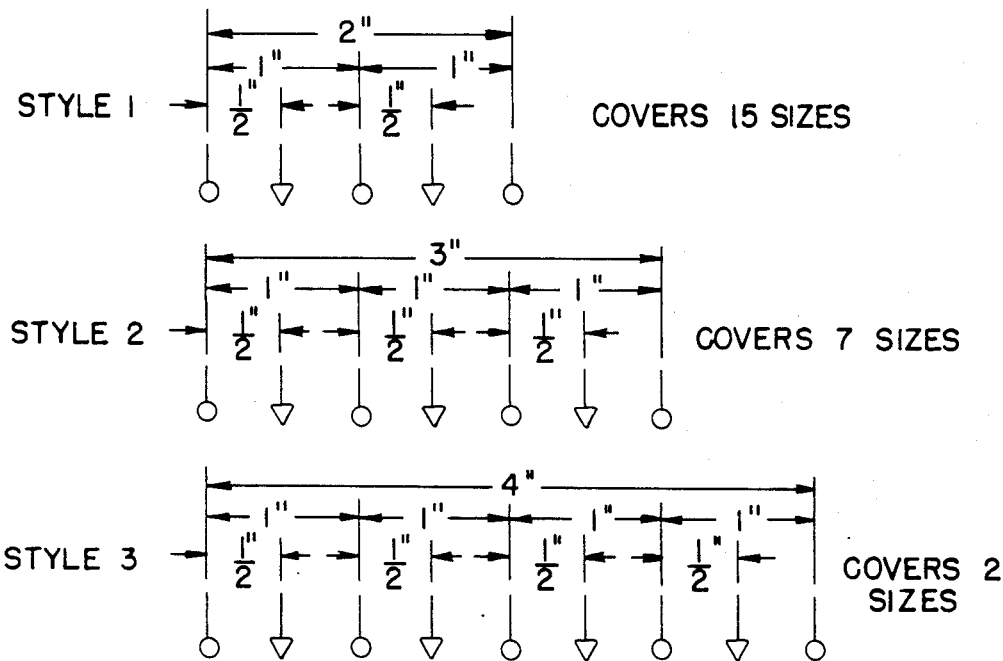
FIG. 15 is a schematic illustration of three styles of tool that will cover practically all 8 round casing pipe sizes.

In order to conform with API specifications, all measuring intervals must be located on one inch centers. Thread depth transducers should be located on the center line of each interval but also have one inch intervals. It has been found that by using the measuring concept as disclosed herein, the complete range of pipe sizes (for instance, all sizes of 8 round casing with the exception of a few odd sizes) can be readily measured by the use of three such tools. FIG. 15 shows the three styles of tools that can accomplish such a wide range of pipe sizes.

Figure 16:
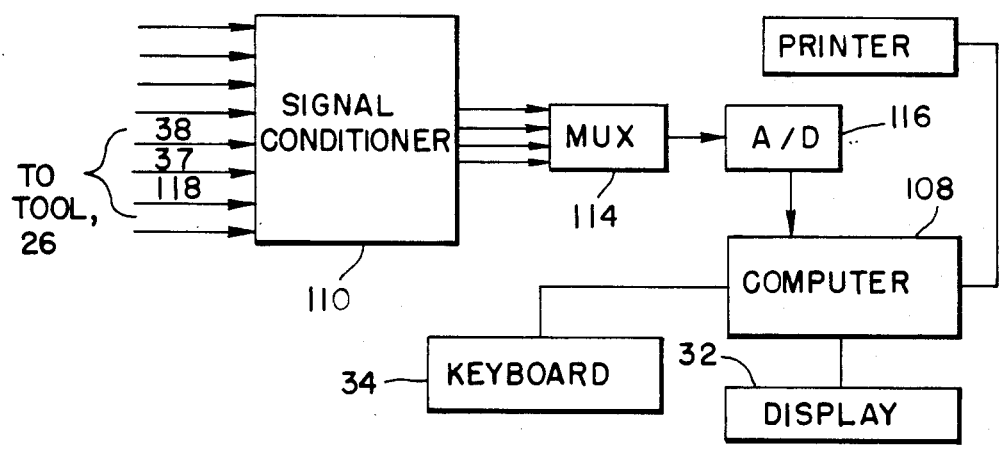
FIG. 16 is an abbreviated block diagram of the signal processor shown in FIG. 1.

With reference now to FIG. 16, there is shown a general description of the signal processor 36. The processor 36 includes a computer 108, a signal conditioning unit 110 a multiplexor 114, and an analog-to-digital converter 116.

Any suitable control system and signal processor can be used in conjunction with the tool. For instance, the system can include a general purpose microprocessor in the electronic module, which together with suitable software such as that in the Appendix herein, will carry out all necessary calculations and control functions. The entire system including the electronic module, tool, display and printer can be made portable and battery operated, if desired.

The conditioning unit 110 receives electric signals from the tool 26 via cables. FIG. 16 shows cables 37, 38, 118. However, it is understood that other cables for the described signals as well as additional lines for other functions may be added. These signals, after conditioning, are multiplexed by the multiplexer 114 before transmission to the computer 108. The converter 116 converts the signals of the multiplexer 114 from the analog format, as produced by the tool 26, to a digital format for further processing by the computer 108.

The computer 108 can be a special purpose computer specifically designed for combining the signals of the various probes 28, the transducers 78 and the transducer 60 for outputting the desired data on the display 32. However, as hereinbefore mentioned, the calculations performed by the computer 108 can also be accomplished by a general purpose computer, or microprocessor, as will be described hereinafter by means of a flow chart suitable for such microprocessor.

The thread characteristics of lead error, height error, and deviation of diameter are provided by combining signals of the probes 28. The position of the base 42 relative to the end of the pipe 24 is communicated from the transducer 60 via a cable 118 to the processor 36. The construction and operation of the transducer 60 is the same as that described above with respect to the transducers 79. The inclinometer 46 is used for the measurement of the thread characteristic of taper.

The computer 108 has the standard components including timing and control units, address generator, memory, electronic switches shift registers subtractors, and averaging units. In operation, the signal processor 36 receives input signals along the cables 37, 38 and 118, and outputs power for energizing the input windings of the various transducers and any reference input terminals for detection of the magnitude and sense of the voltage from the outputs of one of the transducers. Conditioning unit 110 can include band pass filters for removing any noise which may be present on a transducer signal.

The multiplexer 114 is operated under control of the timing unit for electronically sampling successive ones of the transducer signals and for outputting these signals serially to the converter 116. Each of these signals has a magnitude and a sense, and each sample is then converted by the converter 116 to a digital format containing the amplitude and sense data. The digital signals of the converter are outputted to the memory 124 of the computer 108.

The memory and other components in the computer operate under control of the computer unit 120, as required, for receiving digital signals and for outputting digital signals. To measure the pitch line deviation and develop pitch line non-linearity, of the threaded portion of the pipe 24, the signals of the probes 28B, 28D and 28F are taken into the signal processor for computation which is then shown on the unit's display 32. To provide the thread height, signals from the probes 28C and 28E are likewise taken into the signal processor for computation, the results of which are also displayed in display unit 32. For measurement of the cumulative thread lead, the signals of transducer 79G coupled to the probe 28G are sent to the computer for processing and display. It is noted that probe 28A serves as a reference point. For measurement of the taper, the signal from inclinometer 11 is fed to the signal processor.

A more general form of test routine can be accomplished by use of a general purpose computer by use of the flow sheets and tabulations presented in the Appendix at the end to this specification. The material presented therein is in standard format and, accordingly, readily understood. Accordingly, this material will be reviewed briefly. At the beginning of the flow sheet, a keyboard entry would indicate whether a calibration measurement is to be made or whether the operation is to proceed for actual measurement.

Calibration is employed, such calibration being accomplished by attaching the tool 26 to a calibrated gage and, thereafter, noting the transducer measurements presented on the display 32. These latter results are also stored in the memory of the computer for comparison to the actual measurements. This, in effect, amounts to a zeroing of the tool 26 so that the discrepancy between the standard values and the actual values can be attained.

Proceeding with the flow chart in the Appendix, the system contemplates the use of a printer (not shown) which operates in conventional fashion for outputting information from the computer. The keyboard instructions are then followed as to whether the instructions to the tool 26 are to be printed out or not.

Thereafter, the program continues with the inputting and storage of data. Then a decision block decides whether the last data has been entered or not. In the event that more data is to be entered then the process is repeated for the inputting of further data. If the last parameter has been entered, then the process continues to identify the nature of the thread, if a pipe or if a coupling. Thereafter, identification number may be applied and input parameters printed out.

During the ensuing steps in the flow chart, symbols are presented so as to simplify the amount of legends presented in each box of the flow chart. The symbols are identified in the table following the flow chart in the Appendix. The computer can operate with the tool 26 for reception of the raw data and for calculation of the desired thread characteristics.

All of the patents and publications referred to in this description are incorporated by reference in their entireties herein. It is to be understood that the above described embodiment of the invention is illustrative only, and that modifications thereof may occur to those skilled in the art. Accordingly, this invention is not to be regarded as limited to the embodiment disclosed herein, but is to limited only as defined by the appended claims.

APPENDIX

THREAD INSPECTION FLOW CHART

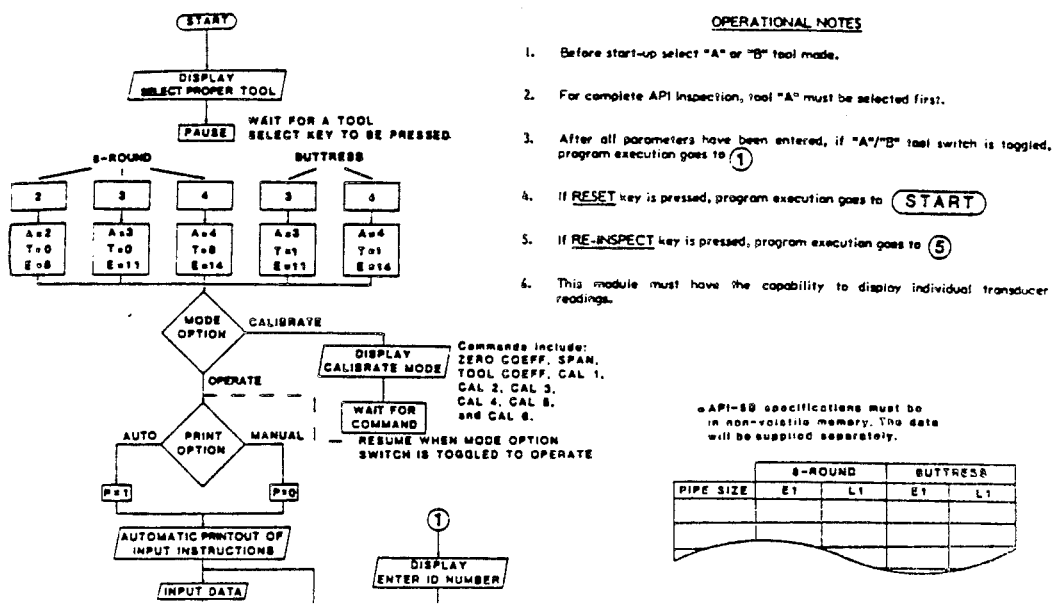

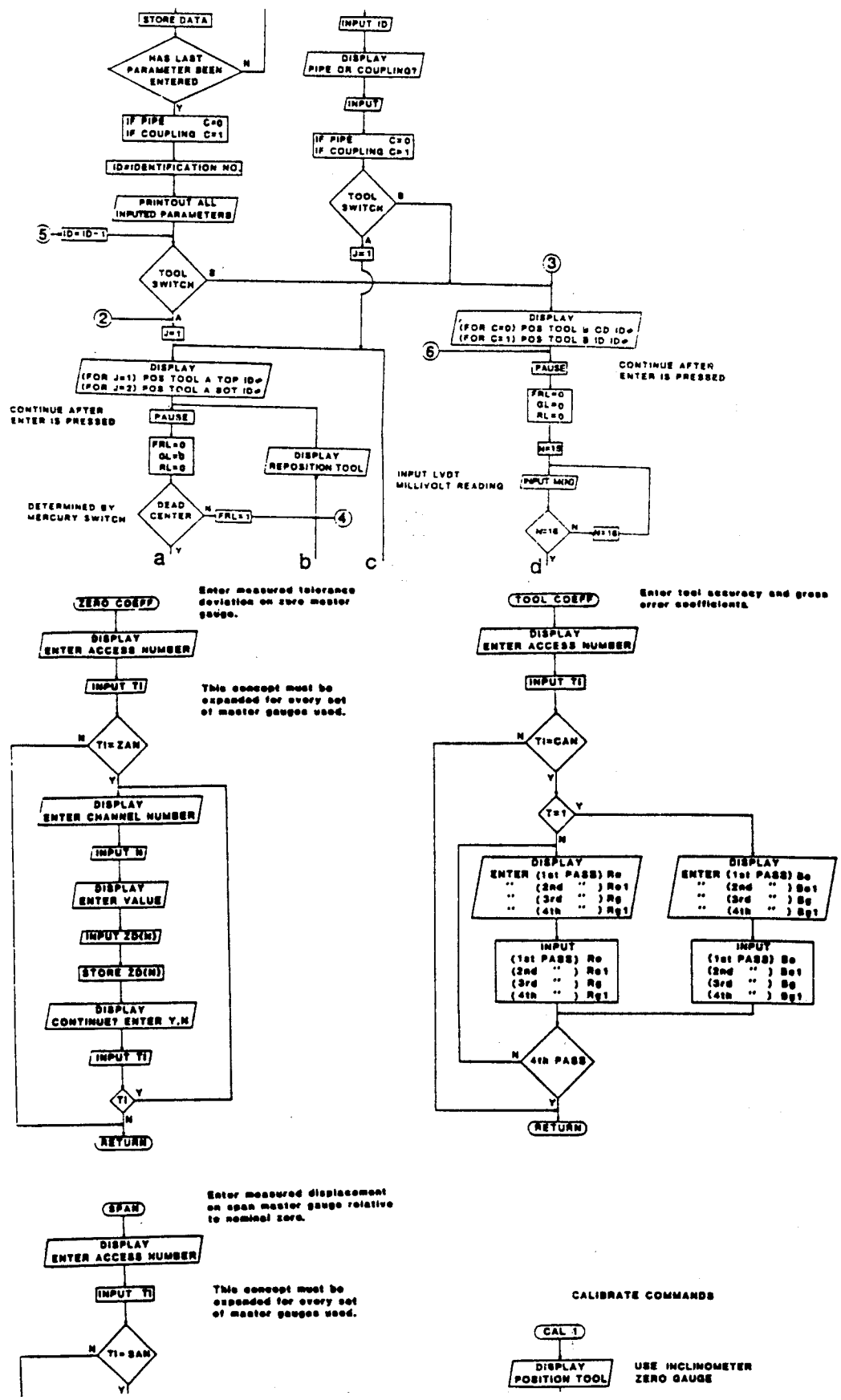

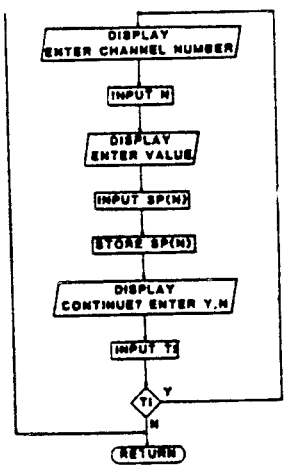
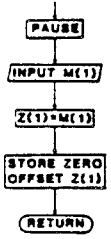
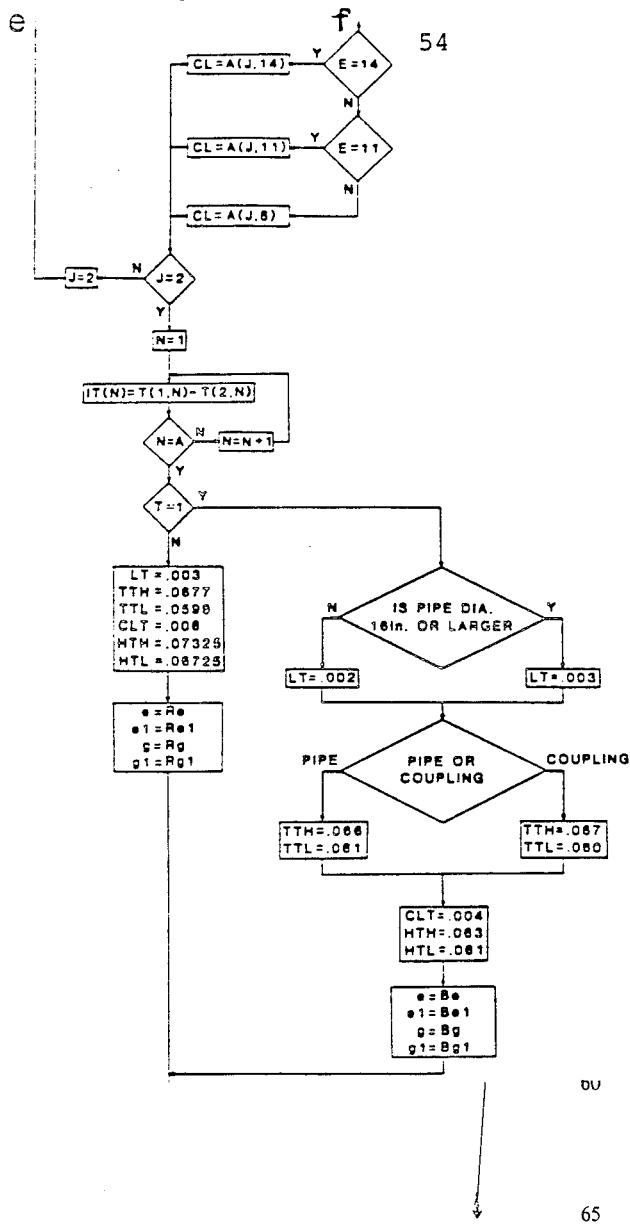

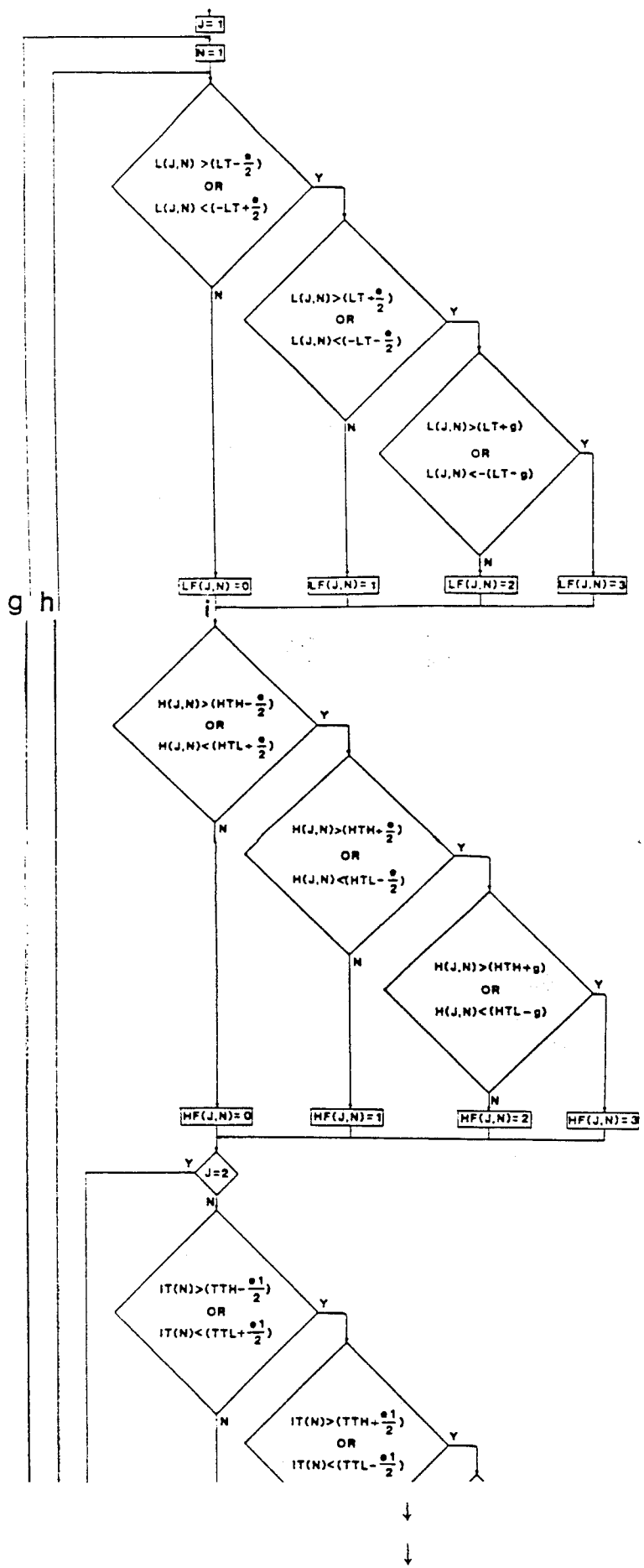

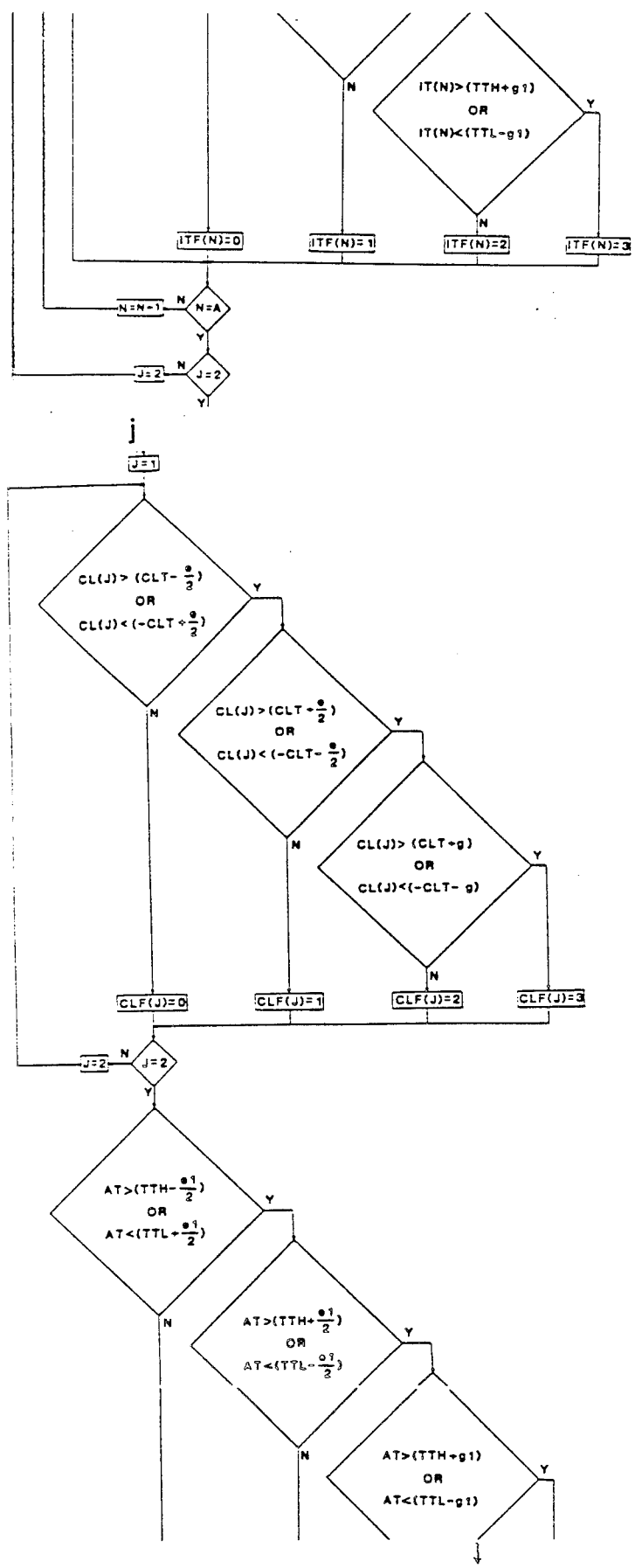

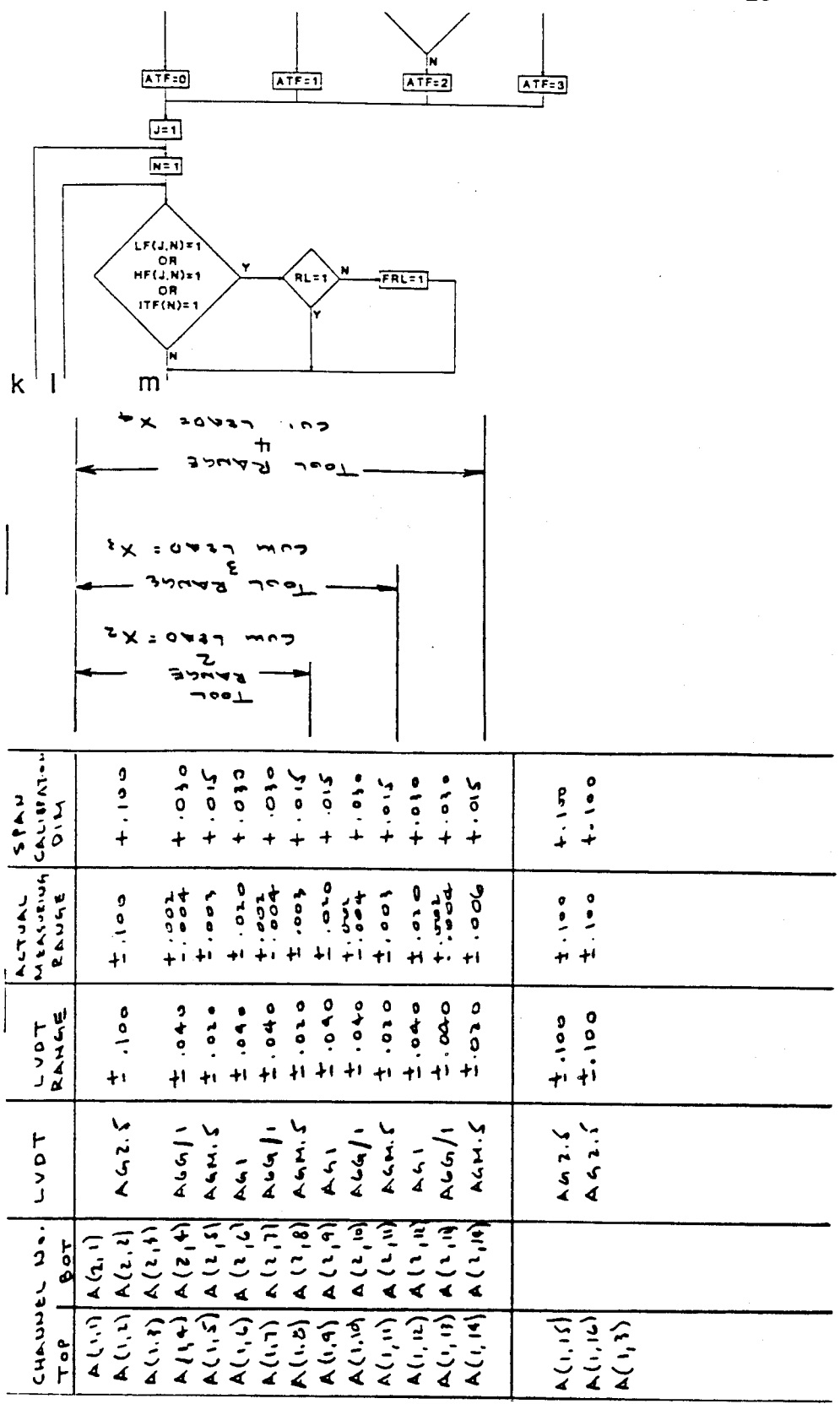

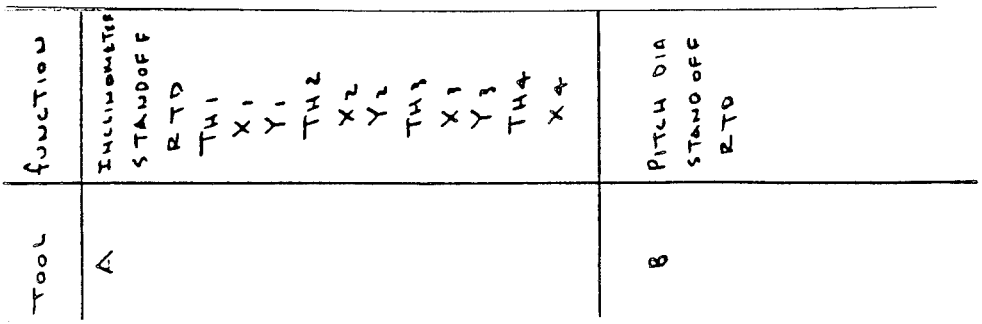
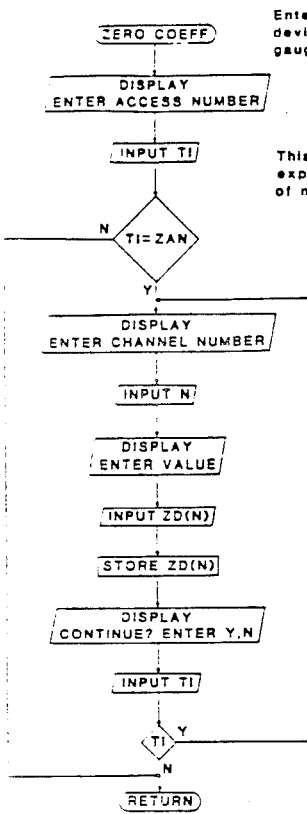
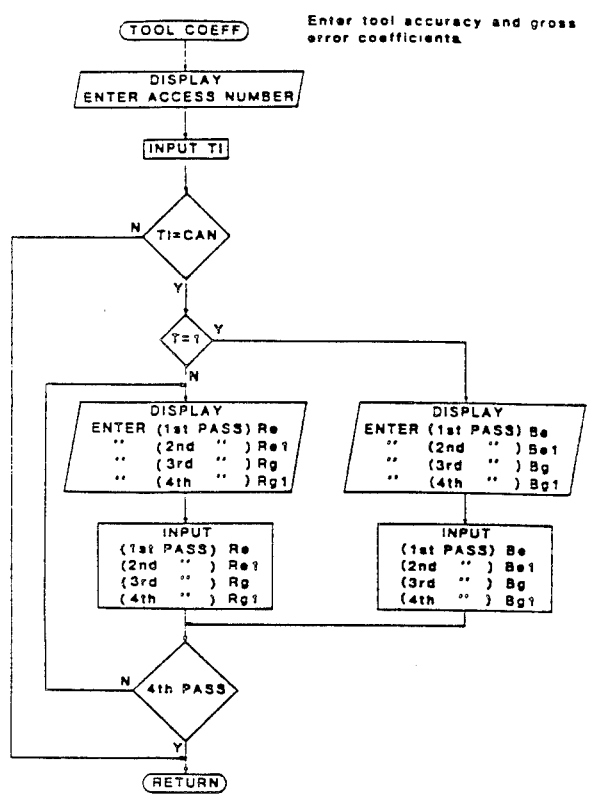
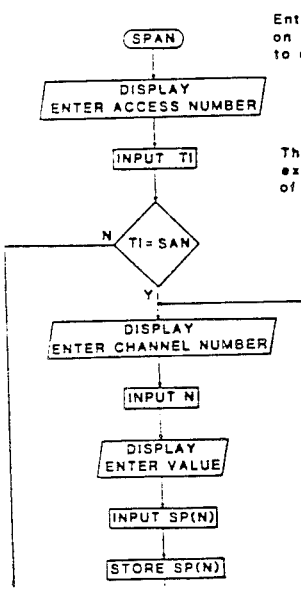
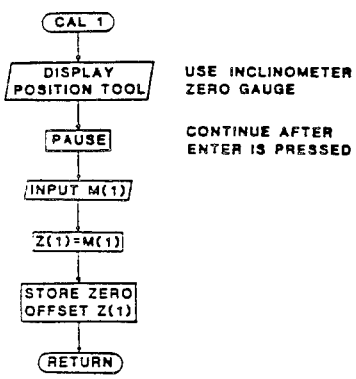

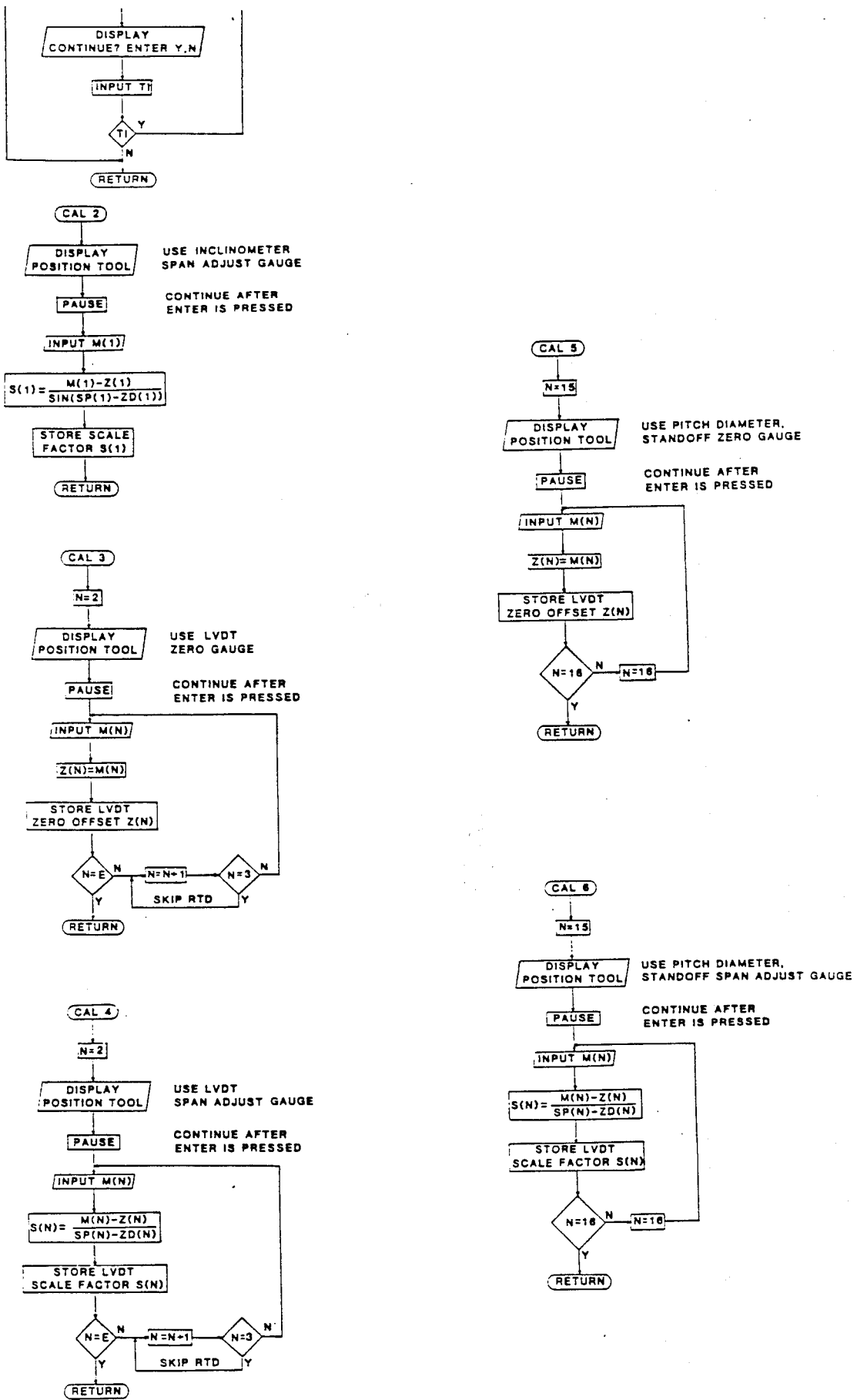

FLOW CHART VARIABLE TABLE

| VARIABLE | SIGNIFICANCE | DIMENSION |
|---|---|---|
| A | Number of intervals on tool | - |
| A( , ) | A( ,1) Inclinometer reading | Deg. |
|  | A( ,2-16) LVDT readings | in |
| AT( ) | Average Taper   AT = AT(ID) | in/in |
| ATF | Average Taper Flag | - |
| Be | Buttress tool error factor | in |
| Be1 | Buttress tool error factor | in/in |
| Bg | Buttress gross error factor | in |
| Bg1 | Buttress gross error factor | in/in |
| C | 0 if pipe 1 if coupling | - |
| CAN | Coefficient Access Number | - |
| CL( ) | Cumulative Lead | in |
| CLF( ) | Cumulative Lead Flag | - |
| CLT | Cumulative Lead Tolerance | in |
| D( , ) | Diameter deviation | in |
| DA | Diameter Actual | in |
| DZ | Diameter when Zeroed | in |
| $\Delta$D | Delta Diameter | in |
| E | The number of channels that the tool uses |  |
| E1 | E1 dimension from API 5B | in |
| e | Tool error factor | in |
| e1 | Tool error factor | in/in |
| FRL | Flashing red light 0-off 1-on |  |
| GL | Green light 0-off 1-on |  |
| g | gross error factor | in |
| g1 | gross error factor | in/in |
| H( , ) | (thread) Height | in |
| HF( , ) | (thread) Height Flag | - |
| HTH | (thread) Height Tolerance High | in |
| HTL | (thread) Height Tolerance Low | in |
| ID | Current Identification Number |  |
| IT( ) | Interval Taper | in/in |

| | | |
|---|---|---|
| ITF( ) | Interval Taper Flag | - |
| J | Incremental subscript 1 for top of pipe 2 for bottom of pipe | - |
| L( , ) | Lead error | in |
| LF( , ) | Lead error Flag | - |
| LT | Lead Tolerance | in |
| LI | LI dimension from API 5B | in |
| LIC | LI dimension Calculated | in |
| LIF | LI Flag | - |
| M | Half of average taper | in/in |
| M( ) | LVDT Millivolt data | mv |
| N | Incremental subscript meaning channel number or interval | - |
| P | Print option flag 0 for manual print, 1 for auto print | - |
| Re | 8-Round tool error factor | in |
| Re1 | 8-Round tool error factor | in/in |
| Rg | 8-Round gross error factor | in |
| Rg1 | 8-Round gross error factor | in/in |
| RL | Red light 0-off 1-on | - |
| S( ) | Scale factor | mv/in |
| SAN | SPAN Access Number | - |
| SO | Stand Off | in |
| SOZ | Stand Off when Zeroed | in |
| SP( ) | Span coefficient | Deg. or in |
| T | 0 for 8-round pipe 1 for buttress | - |
| T( , ) | Taper | in/in |
| TI | Temporary Input | - |
| TTH | Taper Tolerance High | in/in |
| TTL | Taper Tolerance Low | in/in |
| Z( , ) | Zero offset | mv |
| ZAN | Zero coefficient Access Number | |
| ZD( ) | Zero gauge Deviation | Deg. or in |

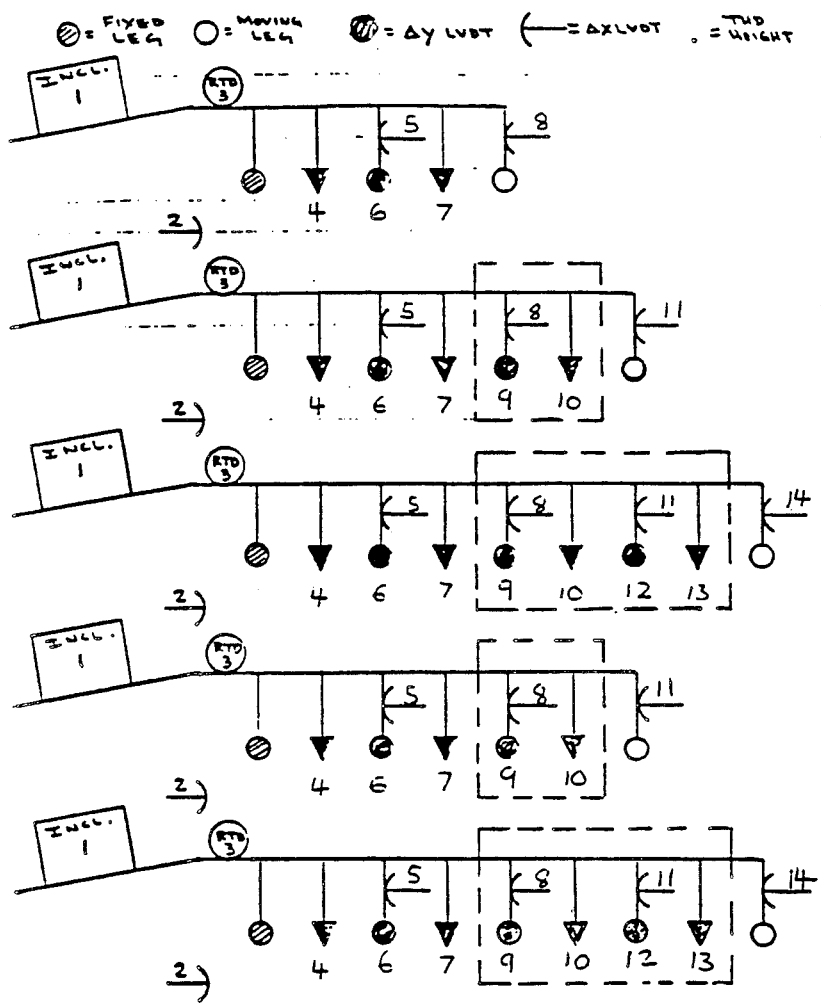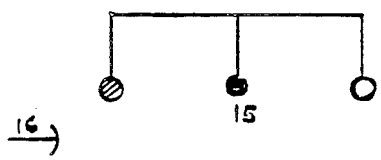

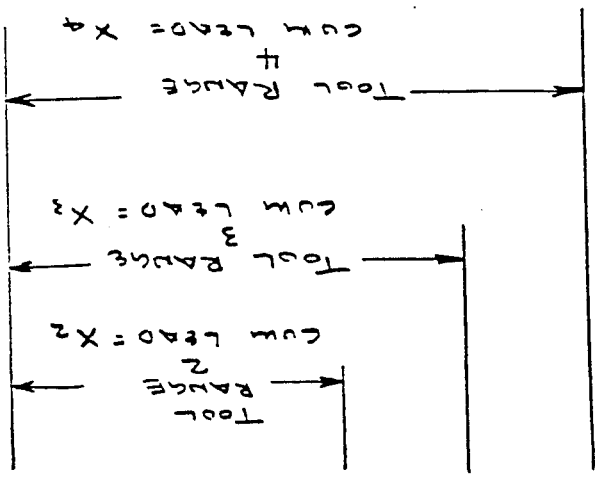
| Tool | Function | Channel No. Top | Channel No. Bot | LVDT | LVDT Range | Actual Measurium Range | Span Calibration Dim |
|---|---|---|---|---|---|---|---|
| A | Inclinometer | A(1,1) | A(2,1) | AG 2.5 | ± .100 | ± .100 | 0 |
| | Standoff | A(1,2) | A(2,2) | AG6/1 | ± .040 | ± .002 / ± .004 | + .040 |
| | RTD | A(1,3) | A(2,3) | AGM.5 | ± .020 | ± .002 / ± .004 | + .020 |
| | TH1 | A(1,4) | A(2,4) | AG1 | ± .040 | ± .020 | + .030 |
| | $X_1$ | A(1,5) | A(2,5) | AGM.5 | ± .020 | ± .002 / ± .004 | + .010 |
| | $Y_1$ | A(1,6) | A(2,6) | AG1 | ± .040 | ± .003 | + .015 |
| | TH2 | A(1,7) | A(2,7) | AGM.5 | ± .020 | ± .020 | + .030 |
| | $X_2$ | A(1,8) | A(2,8) | AG1 | ± .040 | ± .001 / ± .004 | + .010 |
| | $Y_2$ | A(1,9) | A(2,9) | AG1 | ± .040 | ± .003 | + .015 |
| | TH3 | A(1,10) | A(2,10) | AGM.5 | ± .020 | ± .020 | + .030 |
| | $X_3$ | A(1,11) | A(2,11) | AG1 | ± .040 | ± .001 / ± .004 | + .010 |
| | $Y_3$ | A(1,12) | A(2,12) | AG1 | ± .040 | ± .003 | + .015 |
| | TH4 | A(1,13) | A(2,13) | AG1 | ± .040 | ± .020 | + .030 |
| | $X_4$ | A(1,14) | A(2,14) | AGM.5 | ± .020 | ± .006 | + .015 |
| B | Pitch Dia | A(1,15) | | AG 2.5 | ± .100 | ± .100 | + .100 |
| | Standoff | A(1,16) | | AG 2.5 | ± .100 | ± .100 | + .100 |
| | RTD | A(1,3) | | | | | |

We claim:

1. A thread-measuring tool comprising:
   a sensor assembly;
   means for affixing said sensor assembly contiguous to the thread of a pipe section;
   inclinometer means disposed within said assembly for sensing a taper of the thread;
   a first set of probes having at east one probe for the measurement of the height of the thread, at least one of the probes of said first set of probes being slideably mounted within said assembly for movement in a direction normal to the longitudinal axis of the pipe section and for translation in a direction parallel to the axis of said pipe section, the axial translation permitting alignment of individual ones of the probes with corresponding troughs of the thread wherein maximum vertical movements can occur for measurement of the thread height;
   a second set of probes for sensing the location of troughs of the thread, at least one of the probes of the second set being slideably mounted within said assembly in two directions one of which is normal to the axis of the pipe section and a second of which is parallel to the axis of the pipe section, there being means coupled to said probes of said second set for measuring displacement of individual ones of the probes in each of said two directions for obtaining the coordinates of the respective troughs in normal and axial components; and
   means for combining measurements of location in each of said coordinate directions to provide deviation in diameter of the pipe section and error in the lead length of the thread of the pipe section.

2. A tool according to claim 1 wherein said sensor assembly includes a pair of legs extending therefrom and spaced apart from each other for contacting said thread at spaced locations and supporting said assembly on said thread, said fixing means including an arm pivotably connecting with an end portion of said assembly distant from said probes and extending beneath said assembly for contacting a second surface of the wall of the pipe section to inhibit motion of said assembly relative to the thread.

3. A tool according to claim 2 wherein said arm terminates in a pair of contact elements disposed on opposite sides of an axial plane containing said pair of legs to inhibit motion of said assembly relative to said thread in a direction normal to said axial plane.

4. A tool according to claim 1 wherein said probe means of said first set comprises a probe having a pointed contact for setting within a low point of a trough and a transducer for measurement of longitudinal position of the probe, the longitudinal position being used to measure error in the height of the thread.

5. A tool according to claim 1 wherein each of said probe means of said second set comprises a probe having a ball type contact for setting within a trough of the thread and a transducer for measuring longitudinal position of the probe, the set of longitudinal positions of the second set of probe means used to obtain a measurement of deviation in diameter.

6. A tool according to claim 5 wherein said combining means is coupled to the transducers of the second probe means, said combining means indicating the difference in measurements to provide the deviation in diameter.

7. A tool according to claim 6 wherein each probe means of said second set further comprises a second transducer for measurement of transverse position of the probe means of said second set, the transverse position of each probe being used to obtain a measurement of any error in the lead length.

8. A tool according to claim 7 wherein said combining means is coupled to the transverse motion transducers of the second set of probe means, said combining means indicating the values of error in the lead length.

9. A tool according to claim 5 wherein each probe means of said second set further comprises a second transducer for measurement of transverse position of the probe means of said second set, the transverse position of each probe being used to derive a measurement of any error in the lead length.

10. A tool according to claim 9 wherein said combining means is coupled to the transverse motion transducers of the second set of probe means, said combining means indicating the values of error in lead length.

11. A tool according to claim 10 wherein probes of said first set and probes of said second set are arranged in alternating fashion along a row parallel to the axis of the pipe section.

12. A thread measurement tool comprising:
    a sensor assembly;
    means for affixing said sensor assembly contiguous to the thread of a pipe section;
    a set of probe means for sensing the locations of troughs of the thread, at least one of the probe means of the set being slideably mounted within said assembly in two directions one of which is normal to the longitudinal axis of the pipe section and the second of which is parallel to the axis of the pipe section, each of said probe means including a probe and means coupled to said probe for measuring a displacement of the probe in each of the two directions for obtaining the coordinate of a trough in normal and axial components;
    each of said probes having a ball-type contact for setting within a trough of the thread, said displacement measuring means including a first transducer for the sensing of longitudinal motion of the probe and a second transducer for the sensing of translational motion of the probe, the longitudinal motion corresponding to movement in a direction normal to said pipe axis and said transverse motion corresponding to motion along the axis of the pipe; and wherein
    said assembly includes a pair of legs extending therefrom and spaced apart from each other for contacting said thread at spaced locations and supporting said assembly on said thread, said affixing means including an arm pivotably connecting with an end portion of said assembly distant from said probes and extending from said assembly for contacting a second surface of the wall of the pipe section opposite said thread at a location corresponding to a site between said pair of legs to inhibit motion of said assembly relative to the thread in an axial plane of the pipe section, said arm terminating in a pair of contact elements on opposite sides of a plane joining said pair of legs to inhibit motion of said assembly relative to said thread in a direction normal to said plane; and means coupled to said transducers for combining measurements of probe displacements in a direction normal to said longitudinal axis of the pipe section to provide for the determination of deviation in diameter of said pipe section.

13. A tool according to claim 12 wherein said combining means is further coupled to the transducers sensing the transverse position to indicate the error in the lead length of the thread of the pipe section.

14. A tool according to claim 13 further comprising inclinometer means disposed within said assembly and responsive to an inclination of said assembly relative to the axis of said pipe section for sensing a taper of the thread.

15. A tool according to claim 13 further comprising additional probe means including a probe and means including a transducer for measuring longitudinal displacement of the probe, a probe of the additional probe means being mounted within said assembly among the first-mentioned probe means and having a termination for its probe comprising a pointed contact for setting within a low point of a trough of the thread to provide for a measurement of thread height.

16. A portable, automatic thread inspection tool for measuring a plurality of parameters on a pipe thread and the like in situ irrespective of whether the thread is internal or external to the pipe, comprising:
   (a) frame means adapted to be readily installed over the wall of a pipe from the pipe end,
   (b) means located on the frame means for generating a first signal representative of the thread height error,
   (c) means located on the frame means for generating a second signal representative of the thread lead error,
   (d) means located on the frame means for generating a third signal relating to average taper of the thread,
   (e) means associated with the frame means for receiving the first, second and third signals and generating a display of the thread height error, thread lead error and average thread taper relating to the thread being measured.

17. The inspection tool of claim 16 further including means on the frame means for generating a fourth signal representative of cumulative lead error and means associated with the frame means for receiving the fourth signal and generating a display of the cumulative lead error.

18. The inspection tool of claim 16 further including means on the frame means for generating signals representative of pitch line deviation over a given number of intervals of the thread and means associated with the frame means for receiving the pitch line deviation signals and combining them with the third signal to produce a representation of the non-linearity of thread pitch line.

19. A probe assembly for use in a thread measurement tool to measure thread height error automatically when the tool is installed on the thread, the thread having a crest portion and a trough portion and the assembly having a transducer with a case and core wherein the relative positions of the case and core generate a signal indicative of the measurement comprising:
   (a) means on the tool for mounting the transducer case for movement towards and away from the thread;
   (b) probe collar means attached to the case having a portion thereof which seats itself on the crest portion of the thread; and
   (c) probe tip means attached to the transducer core for movement relative to the collar means which seats itself into the trough portion of the thread; whereby the relative positions of the probe tip and probe collar determine the relative positions of the transducer core and transducer case for automatically generating a signal representative of the thread height.

20. The probe assembly of claim 19 wherein the probe tip means is biased away from the tool towards the thread being measured.

21. The probe assembly of claim 19 wherein the transducer case has a stroke of limited movement towards and away from the thread being measured.

22. The probe assembly of claim 19 wherein the thread being measured is a tapered thread on a pipe having a pipe axis and the transducer case, probe collar means and probe tip means move in a direction substantially perpendicular to the axis of the pipe.

23. The probe assembly of claim 19 wherein there are a plurality of probe assemblies on the tool.

24. A method of automatically measuring one or more parameters of a pipe thread and the like in situ which an electronically operating tool comprising:
   (a) installing a thread measuring tool having two pivotally joined arms over the end of a threaded pipe so that a first arm of the tool engages the external surface of the pipe and a second arm of the tool engages the internal surface of the pipe, one of said arms carrying a sensor assembly with a set of spaced, aligned probes that produce respective electrical measurement signals for the measurement of desired parameters of the pipe thread,
   (b) placing the probes into operative contact with the thread at respective spaced locations thereon that lie in a common axial plane through the pipe,
   (c) determining the position of the sensor assembly relative to the end of the pipe,
   (d) activating the sensor assembly trough control means,
   (e) measuring height error on the thread with electrical signals obtained from at least one probe in the set of probes, and
   (f) measuring lead error of the thread with electrical signals obtained from at least one other probe in the set of probes,
   (g) repeating steps (b) through (f) at a circumferentially displaced location on the pipe thread, whereby rapid measurements of multiple parameters of the thread can be made accurately because it is unnecessary for the operator to directly interact with the probes during the measuring process.

25. The method claimed in claim 24 and including the further steps of
   measuring the inclination of the thread proficle throughout substantially its entire length at two substantially diametrically opposed locations, and
   subtracting said two inclination measurements to obtain a measurement of thread taper.

26. The method of claim 24 wherein the measuring steps are carried out simultaneously.

27. The method of claim 24 further including the step of measuring cumulative lead error over a given length of the thread.

28. The method of claim 27 wherein the measuring of cumulative lead error is carried out simultaneously with the height and lead error measurements.

29. The method of claim 24 including the step of measuring the amount of standoff between a first probe on the tool and the end of the pipe.

30. A method of automatically measuring taper of a pipe thread and the like in situ with a tool comprising:
 (a) installing the tool on the pipe thread, the tool having a sensor assembly including an inclinometer means,
 (b) activating the inclinometer means through a control means for providing a first measurement relating to the average taper of the thread relative to a given reference plane,
 (c) storing the first measurement,
 (d) reinstalling the tool at an angularly displaced position on the thread from the installation location of step (a),
 (e) reactivating the inclinometer means through the control means for providing a second measurement relating to the average taper of the thread relative to the given reference plane, and
 (f) subtracting the second measurement from the first measurement to determine the average taper of the thread whereby the average taper of the thread can be determined accurately and rapidly without dependence on the operator's direct interaction with the sensor assembly due to the hands off nature of the tool once installed and activated.

31. The method of claim 30 wherein the sensor assembly further includes a set of probes which measure pitch line deviation of the thread at a given number of intervals over the thread and further including the steps of activating the sensor assembly through the control means for determining the pitch line deviation by the probes at each interval when the tool is both installed and reinstalled on the thread whereby average taper and pitch line deviation are measured to provide a determination of non-linearity of the pitch line.

32. The method of claim 30 wherein the step of reinstalling the tool locates the tool on the pipe approximately opposite the location of the tool when it is first installed on the pipe.

33. The method of claim 30 wherein the tool is installed at approximately the twelve o'clock position on the pipe and is reinstalled at approximately the 6 o'clock position on the pipe.

34. The method of claim 30 wherein the tool is installed within approximately plus or minus 5 degrees of the top dead center of the pipe and reinstalled at approximately plus or minus 5 degrees of the bottom dead center of the pipe.

35. A method of automatically measuring height error, lead error, cumulative lead, average taper, interval taper and pitch line deviation of a pipe thread and the like in situ with the same tool comprising:
 (a) installing a tool having a sensor assembly thereon with a set of probes and an inclinometer means,
 (b) activating the sensor assembly through a control means,
 (c) measuring height error of the thread with at least one probe in the set of probes,
 (d) measuring lead error of the thread with at least one other probe in the set of probes,
 (e) measuring and storing a first value relating to average taper of the thread relative to a given reference plane,
 (f) measuring pitch line deviation of the thread at a given number of intervals over the thread,
 (g) reinstalling the tool at an angularly displaced position on the thread from the installation location of step a,
 (h) reactivating the inclinometer means through the control means for measuring a second value relating to average taper of the thread to the given reference plane,
 (i) subtracting the second value from the first value to determine the average taper of the thread, and
 (j) reactivating the sensor assembly through the control means to measure pitch line deviation of the thread at the given number of intervals while the tool is reinstalled on the thread,
whereby at least one reading is obtained for height error, lead error, cumulative lead, average taper and interval taper and the non-linearity of the pitch line can be determined.

36. The method of claim 35 wherein the measurements are determined simultaneously for each installation of the tool on the thread.

37. The method of claim 35 wherein thread height error, thread lead error and cumulative lead error are all determined again when the tool is reinstalled on the thread.

38. The method of claim 37 wherein the tool includes a printer and a graphic illustration of actual non-linearity of the thread is printed thereby in hard copy form.

39. The method of claim 35 including the step of measuring the amount of standoff between the first probe on the tool and the end of the pipe.

* * * * *